(12) United States Patent
Yamashita

(10) Patent No.: US 8,833,532 B2
(45) Date of Patent: Sep. 16, 2014

(54) SHOCK ABSORBER

(75) Inventor: Mikio Yamashita, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/599,361

(22) Filed: Aug. 30, 2012

(65) Prior Publication Data

US 2013/0048451 A1    Feb. 28, 2013

(30) Foreign Application Priority Data

Aug. 31, 2011    (JP) ................. P2011-189781

(51) Int. Cl.
*F16F 9/34*    (2006.01)
*F16F 9/50*    (2006.01)

(52) U.S. Cl.
CPC ..................... *F16F 9/50* (2013.01)
USPC .................. 188/282.6; 188/322.15

(58) Field of Classification Search
USPC ............ 188/282.1, 282.6, 282.8, 322.15, 188/322.19
See application file for complete search history.

(56) References Cited

U.S. PATENT DOCUMENTS

| | | | | |
|---|---|---|---|---|
| 6,220,409 | B1 * | 4/2001 | Deferme | 188/322.15 |
| 2003/0098210 | A1 * | 5/2003 | Miller et al. | 188/282.6 |
| 2005/0056506 | A1 * | 3/2005 | Deferme | 188/322.15 |
| 2009/0145709 | A1 * | 6/2009 | Kim | 188/322.19 |

FOREIGN PATENT DOCUMENTS

JP    U A 07 019642    4/1995

* cited by examiner

*Primary Examiner* — Christopher Schwartz
(74) *Attorney, Agent, or Firm* — Nixon & Vanderhye P.C.

(57) ABSTRACT

A shock absorber includes a piston partitioning an inside of a cylinder into a rod-side chamber and a bottom-side chamber, a piston rod having a first end connected to the piston and a second end extending to an outside of the cylinder, a housing provided on the first end side of the piston rod, a free piston slidably inserted into the housing, a rod passage allowing the rod-side chamber to communicate with a pressure chamber within the housing, and damping valves provided in passages allowing the rod-side chamber to communicate with the bottom-side chamber. The free piston is provided with a shutter member that adjusts the opening area of a pressure chamber opening of the rod passage according to a movement of the free piston.

20 Claims, 10 Drawing Sheets

SHOCK ABSORBER

BACKGROUND OF THE INVENTION

1. Field of the Invention

The present invention relates to a shock absorber.

Priority is claimed on Japanese Patent Application No. 2011-189781, filed Aug. 31, 2011, the contents of which are incorporated herein by reference.

2. Description of the Related Art

Shock absorbers include a shock absorber in which the damping force characteristics are variable according to the vibrational state (for example, refer to Japanese Unexamined Utility Model Application, First Publication No. H7-19642).

Incidentally, there is a requirement to control damping force characteristics more finely.

SUMMARY OF THE INVENTION

In order to achieve the object above, according to one aspect of the present invention, a shock absorber includes a cylinder having a working fluid enclosed therein; a piston slidably fitted into the cylinder and partitioning an inside of the cylinder into a rod-side chamber and a bottom-side chamber; a piston rod having a first end connected to the piston and a second end extending to the outside of the cylinder; a housing provided on the first end side of the piston rod; a free piston slidably inserted into the housing; a rod passage allowing a pressure chamber within the housing delimited by the free piston to communicate with the rod-side chamber; and damping valves provided in passages allowing the rod-side chamber to communicate with the bottom-side chamber. The free piston is provided with a shutter member that adjusts an opening area of a pressure chamber opening formed in the pressure chamber of the rod passage according to a movement of the free piston.

According to a second aspect of the present invention, in the first aspect, the pressure chamber opening of the rod passage may open to an end face of the piston rod. The shutter member may protrude from the free piston, and may have a shape capable of entering the pressure chamber opening.

According to a third aspect of the present invention, in the first aspect, a shock absorber may include a resistance element that generates a resistance force against a displacement of the free piston.

According to a fourth aspect of the present invention, in the second aspect, a shock absorber may include a resistance element that generates a resistance force against a displacement of the free piston.

According to a fifth aspect of the present invention, in the third aspect, the resistance element may be a spring.

According to a sixth aspect of the present invention, in the fourth aspect, the resistance element may be a spring.

According to a seventh aspect of the present invention, in the third aspect, the resistance element may have one or a plurality of elastic bodies provided between the free piston and the housing. At least one contact surface of a free piston contact surface of the free piston that the elastic body contacts and a housing contact surface of the housing that the elastic body contacts may have a face that inclines with respect to the movement direction of the free piston. A shortest distance of the free piston contact surface and the housing contact surface may vary depending on the movement of the free piston.

According to an eighth aspect of the present invention, in the fourth aspect, the resistance element may have one or a plurality of elastic bodies provided between the free piston and the housing. At least one contact surface of a free piston contact surface of the free piston that the elastic body contacts and a housing contact surface of the housing that the elastic body contacts may have a face that inclines with respect to the movement direction of the free piston. A shortest distance of the free piston contact surface and the housing contact surface may vary depending on the movement of the free piston.

According to a ninth aspect of the present invention, in the seventh aspect, a plurality of the elastic bodies may be provided, and the elastic body may have a first elastic body that is compressively deformed when the free piston has moved in a first direction, and a second elastic body that is compressively deformed when the free piston has moved in a second direction.

According to a tenth aspect of the present invention, in the eighth aspect, a plurality of the elastic bodies may be provided, and the elastic body may have a first elastic body that is compressively deformed when the free piston has moved in a first direction, and a second elastic body that is compressively deformed when the free piston has moved in a second direction.

DETAILED DESCRIPTION OF THE INVENTION

Figure 1:
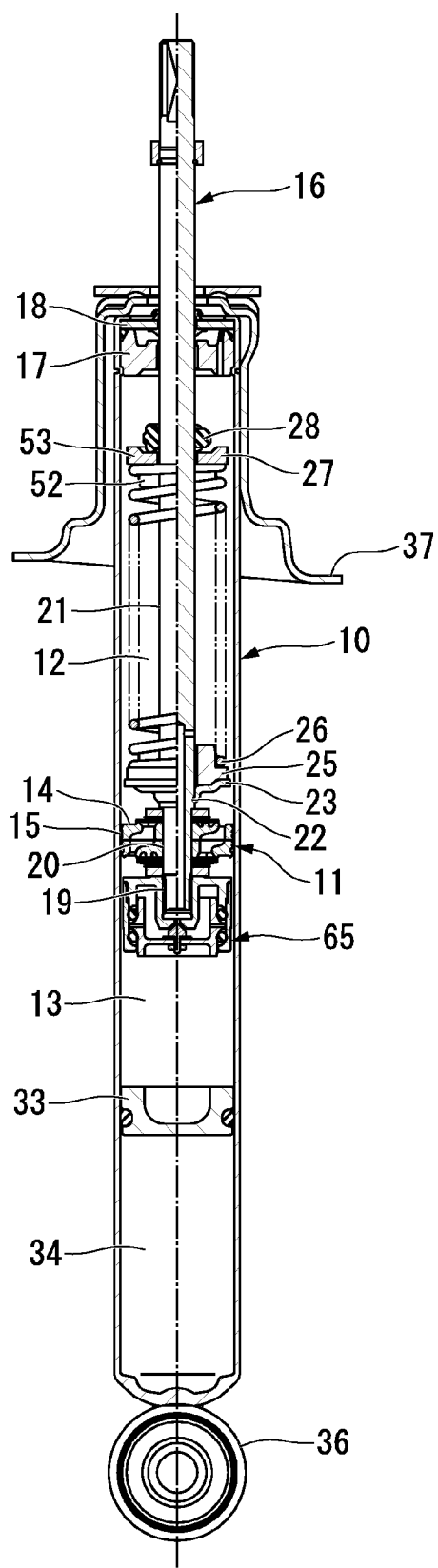
FIG. 1 is a cross-sectional view showing a shock absorber of a first embodiment of the present invention.

Embodiments to be described below solve various other challenges and produce various other effects, without being limited to effects described above. The main challenges to be solved by the following embodiments also include the matters described in the above-described sections, and are listed hereinafter.

Characteristic Improvement

If switching between a characteristic of generating a small damping force and a characteristic of generating a large damping force occurs abruptly, the damping force that is actually generated also changes abruptly. Thus, the ride comfort of a vehicle deteriorates. Moreover, if switching of a damping force occurs during the steering of the vehicle, the behavior of the vehicle may be unstable and a driver may feel uncomfortable with respect to steering. Therefore, characteristic setting, such as smoother changing, is required when the damping force characteristics (a damping force with respect to the piston speed) are changed according to a vibrational state. Thus, as shown in Japanese Unexamined Utility Model Application, First Publication No. H7-19642 that is previously shown, the characteristic setting that is more smoothly changed is studied, and further characteristic improvement is desired.

Suppression of Increase in Size

As shown in Japanese Unexamined Utility Model Application, First Publication No. H7-19642, two chambers are partitioned within a cylinder, and in addition to a piston having a mechanism that generates a damping force, a free piston is provided on one end side of the piston and moves up and down within the housing. Thereby, various cylinder units, which are improved so that damping force characteristics corresponding to a broad region of oscillation frequency are obtained, have been developed. A challenge common to the cylinder units includes that the cylinder units is lengthening the cylinder units in the axial direction because a region where the free piston moves up and down is required. If the cylinder units are enlarged, an increase in the axial length of the cylinder units is a great challenge because the degree of freedom in attachment to a vehicle body declines. Additionally, if the region where the free piston moves up and down, and the axial length of the cylinder units are as usual, there is a challenge in that the stroke range of the piston is shortened and the ride comfort and maneuvering stability are affected. Moreover, if a mechanism that adjusts the damping force is attached from the outside, because that portion of the cylinder unit increases in size, there has been strong demand for a reduction in the size of a frequency response unit.

Reduction in Number of Parts

As shown in Japanese Unexamined Utility Model Application, First Publication No. H7-19642 that is previously shown, since the constituent parts, such as the housing and the free piston, are provided in addition to the piston. Therefore, the number of parts increases. If the number of parts increases, productivity, durability, reliability, and the like are affected. Therefore, a reduction in the number of parts is desired while including desired characteristics, that is, so that damping force characteristics corresponding to a broad region of oscillation frequency are obtained.

Respective embodiments related to the present invention will be described below with reference to the accompanying drawings.

First Embodiment

A first embodiment related to the present invention will be described with reference to FIGS. 1 to 6. In the following description, in order to make the embodiment easily understood, the lower side in the drawings is defined as a first side, and conversely, the upper side in the drawings is defined as a second side.

As shown in FIG. 1, the shock absorber of a first embodiment is a so-called mono-tube type hydraulic shock absorber, and has a bottomed cylindrical cylinder 10 in which that an oil fluid as a working fluid is enclosed. A piston 11 is slidably fitted within the cylinder 10, and the inside of the cylinder 10 is partitioned into two chambers of an upper chamber 12 (rod-side chamber) on the opening side, and a lower chamber 13 (bottom-side chamber) on the bottom side by the piston 11. The piston 11 is constituted by a piston body 14, and an annular sliding member 15 that is mounted on the outer peripheral surface of the sliding member.

The piston body 14 of the piston 11 is connected to a first end portion of a piston rod body 16. A second end side of the piston rod body 16 is inserted through a rod guide 17, an oil seal 18, and the like on the opening side of the cylinder 10, and extends to the outside of the cylinder 10. The opening side of the cylinder 10 is swaged therein, and this locks the oil seal 18 and the rod guide 17.

An attachment shaft portion 20 to which the piston body 14 is attached is formed on the tip side of the piston rod body 16 that is inserted into the cylinder 10. The portion other than attachment shaft portion 20 is a main shaft portion 21 having a larger diameter than the attachment shaft portion 20. A male thread 19 is formed on the outer peripheral side of the attachment shaft portion 20 opposite to the main shaft portion 21. A locking groove 22 is formed at the position of the main shaft portion 21 in the vicinity of the attachment shaft portion 20. The inner peripheral portion of a retainer 23 that becomes wider radially outward than the main shaft portion 21 is swaged and fixed to the locking groove 22.

An annular spring receiver 25 is arranged on the side of the retainer 23 opposite the piston 11, and a rebound spring 26 including a coil spring is arranged on the side of the spring receiver 25 opposite the retainer 23. Additionally, an annular spring receiver 27 is arranged on the side of the rebound spring 26 opposite the spring receiver 25, and a cushioning body 28 made of an elastic material is provided on the side of the spring receiver 27 opposite the rebound spring 26. The spring receiver 25, the rebound spring 26, the spring receiver 27, and the cushioning body 28 are provided so as to be axially movable with respect to the piston rod body 16.

Here, if the piston rod body 16 moves in a direction in which the piston rod body protrudes from the cylinder 10, the spring receiver 25, the rebound spring 26, the spring receiver 27, and the cushioning body 28 move toward the rod guide 17 together with the retainer 23 fixed to the piston rod body 16. Thereby, the cushioning body 28 abuts against the rod guide 17 at a predetermined position. Moreover, if the piston rod body 16 moves in the protruding direction, the cushioning body 28 and the spring receiver 27 are brought into a stopped state with respect to the cylinder 10. As a result, the retainer 23 and the spring receiver 27 are brought close to each other. Thereby, the spring receiver 27 and the spring receiver 25 compresses and extends the rebound spring 26 therebetween. The rebound spring 26 provided within the cylinder 10 in this way resiliently acts on the piston rod body 16, and suppresses the full extension of the piston rod body 16. In this way, since the rebound spring 26 serves as a resistance to the full extension of the piston rod body 16, floating of wheels on the inner peripheral side during vehicle turning is suppressed and the rolling amount of the vehicle body is restrained.

A partition body 33 for forming the lower chamber 13 is slidably provided within the cylinder 10 nearer to the bottom side of the cylinder 10 than the piston 11. An oil fluid is enclosed within the upper chamber 12 and the lower chamber 13 in the cylinder 10, and high-pressure (about 20-30 atmospheres) gas is enclosed in the chamber 34 separated from the lower chamber 13 by the partition body 33.

For example, the first side of the above-described shock absorber is supported by the vehicle body and the wheel side is fixed to the second side of the shock absorber. Specifically, the piston rod body 16 is connected to the vehicle body side, and an attachment eye 36 is connected to the wheel side. The attachment eye 36 is attached to the bottom of the piston rod body 16 opposite to the protruding side of the cylinder 10. In such a case, a suspension spring (not shown) is interposed between the spring receiver 37 fixed to the protruding side of the piston rod body 16 of the cylinder 10 and the vehicle body. Additionally, contrary to the above, the second side of the shock absorber may be supported by the vehicle body, and the wheel side may be fixed to the first side of the shock absorber.

If the wheels vibrate with traveling, the positions of the cylinder 10 and the piston rod body 16 change relatively with the vibration, but the above change is suppressed by the fluid resistance of a channel formed in the piston 11. As will be described in detail below, the fluid resistance of the channel formed in the piston 11 is made so as to change depending on the speed and amplitude of the vibration, and ride quality is improved by suppressing the vibration. The inertia force or centrifugal force acting on the vehicle body when the vehicle moves other than the vibration generated by the wheels also act between the cylinder 10 and the piston rod body 16. For example, as the running direction changes depending on the operation of a steering wheel, a centrifugal force is generated in the vehicle body, and a force based on this centrifugal force acts between the cylinder 10 and the piston rod body 16. As will be described below, the shock absorber of the present embodiment has good characteristics against the vibration based on the force generated on the vehicle body when traveling, and high stability during vehicle traveling is obtained.

Figure 2:
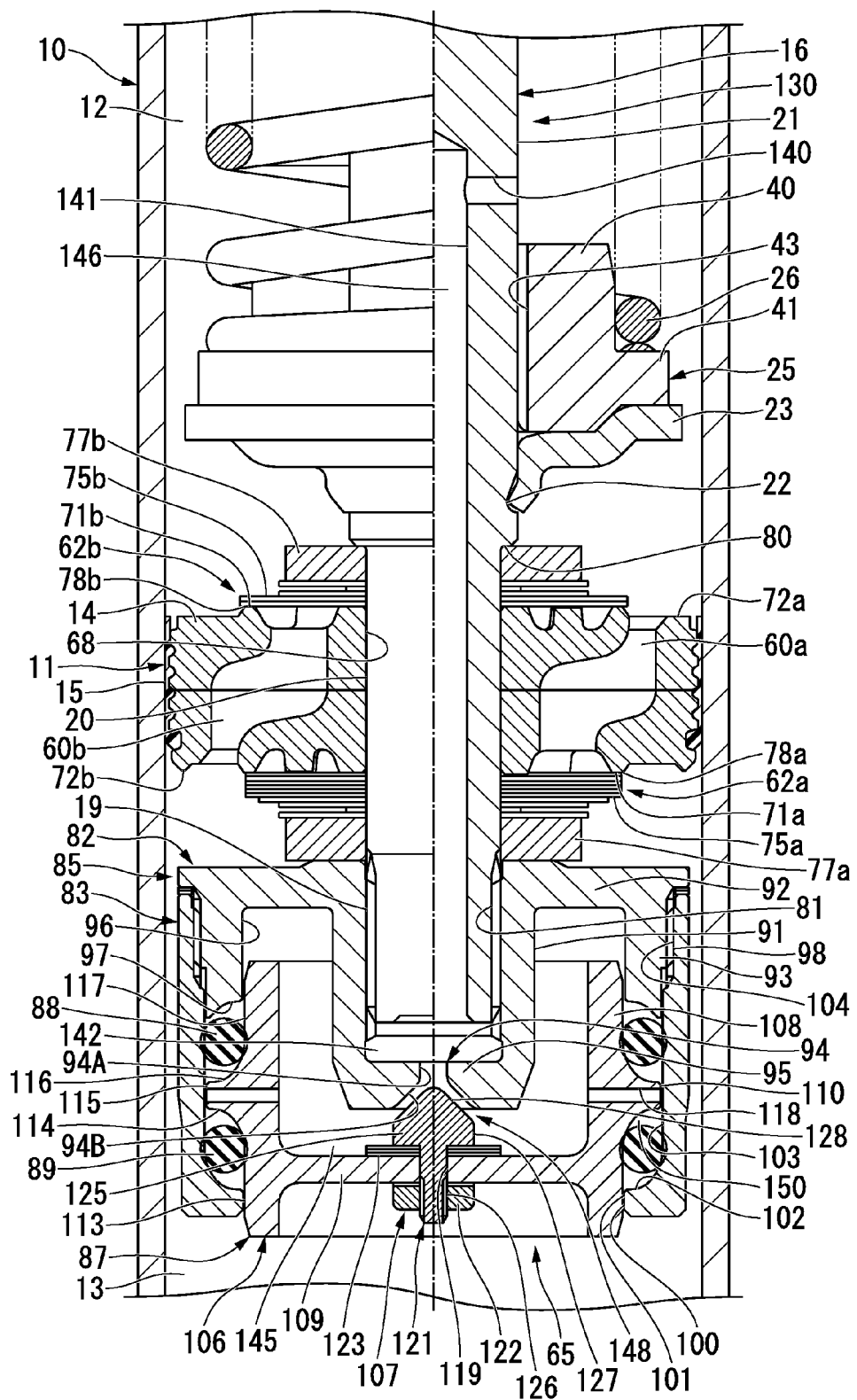
FIG. 2 is a cross-sectional view showing main parts of the shock absorber of the first embodiment of the present invention.

As shown in FIG. 2, the spring receiver 25 has a cylindrical portion 40 that is a substantially cylindrical shaped, and an annular flange portion 41 that protrudes radially outward from one axial side of the cylindrical portion 40. Additionally, a plurality of grooves 43 that extend in the axial direction are formed at intervals in the circumferential direction in the inner peripheral surface of the cylindrical portion 40. As for the spring receiver 25, the flange portion 41 is arranged on the retainer 23 side, and the main shaft portion 21 of the piston rod body 16 is inserted into the inner peripheral side of the cylindrical portion 40. Thereby, the spring receiver 25 is slidably supported by the main shaft portion 21 of the piston rod body 16. Additionally, the spring receiver 25 abuts against the retainer 23 in the flange portion 41 and the cylindrical portion 40, and causes one end portion of the rebound spring 26 to abut against the side of the flange portion 41 opposite the retainer 23.

As shown in FIG. 1, the spring receiver 25 has a tapered tubular portion 52, and an annular flange portion 53 that protrudes radially outward from the larger-diameter side of the tubular portion 52. As for the spring receiver 27, the flange portion 53 is arranged on the side opposite to the rebound spring 26, and the main shaft portion 21 of the piston rod body 16 is inserted into the tubular portion 52. Thereby, the spring receiver 27 is slidably supported by the main shaft portion 21 of the piston rod body 16. The spring receiver 27 causes the other end portion of the rebound spring 26 to abut against the flange portion 53.

As shown in FIG. 2, the piston body 14 is provided with a plurality of passages 60a, and a plurality of passages 60b through which the oil fluid flows out of the lower chamber 13 toward the upper chamber 12, during movement of the piston 11 toward the lower chamber 13, that is, in a compression stroke.

The plurality of passages 60a are passages through which the upper chamber 12 and the lower chamber 13 are allowed to communicate with each other and the oil fluid flows out of the upper chamber 12 toward the lower chamber 13, during movement of the piston 11 toward the upper chamber 12, that is, in an extension stroke. The plurality of passages 60b are passages through which the oil fluid flows out of the lower chamber 13 toward the upper chamber 12, during movement of the piston 11 toward the lower chamber 13, that is, in an extension stroke. From the standpoint of the relationship shown in the cross-section, only one among the plurality of passages 60a and only one among a plurality of passages 60b are shown in FIG. 2, respectively.

The passages 60a that constitutes a half among these passages are formed at equal pitches in the circumferential direction with one passages 60b interposed therebetween. The axial second side of the piston 11 (upper side of FIG. 2) opens to the radial outside, and the axial first side (lower side FIG. 2) opens to the radial inside.

The passages 60a of the half number are provided with a damping valve 62a that generates a damping force. The damping valve 62a is arranged on the lower chamber 13 side in the direction of the axis of the piston 11. When the piston 11 moves to the extension side where the piston rod body 16 extends out of the cylinder 10, the passages 60a constitutes extension-side passages through which the oil fluid passes. The damping valve 62a provided for these passages is an extension-side damping valve that regulates the flow of the oil fluid of the extension-side passages 60a to generate a damping force.

Additionally, the passages 60b that constitutes the remaining half are formed at regular pitches in the circumferential direction with one passages 60a interposed therebetween. The first side (lower side of FIG. 2) in the direction of the axis of the piston 11 opens to the radial outside, and the second side (upper side of FIG. 2) in the direction of the axis opens to the radial inside.

The passages 60b of the remaining half are provided with a damping valve 62b that generates a damping force. The damping valve 62b is arranged on the upper chamber 12 side in the direction of the axis of the piston 11. The passages 60b constitute compression-side passages through which the oil fluid passes when the piston 11 moves to the compression side where the piston rod body 16 enters the cylinder 10, and the damping valve 62b provided for the passages 60b is a compression-side damping valve that regulates the flow of the oil fluid of the compression-side passages 60b to generate a damping force.

A damping force variable mechanism 65 is attached to the piston rod body 16, on the end side of the attachment shaft portion 20 on one end side of the piston rod body closer to the one end side than the piston 11.

The piston body 14 is substantially disk-shaped, and an insertion hole 68 that penetrates in the axial direction to allow the attachment shaft portion 20 of the piston rod body 16 to be inserted therethrough is formed at the center of the piston body 14.

A seat portion 71a that constitutes the damping valve 62a is formed at one-end opening positions of the extension-side passages 60a at the end portion of the piston body 14 on the lower chamber 13 side in the axial direction. A seat portion 71b that constitutes the damping valve 62b is formed at one-end opening positions of the compression-side passages 60b at the end portion of the piston body 14 on the upper chamber 12 side in the axial direction.

In the piston body 14, an annular stepped portion 72b having a lower axis direction height than the seat portion 71a on the side of the seat portion 71a opposite the insertion hole 68. The other ends of the compression-side passages 60b opens to the position of the stepped portion 72b. Additionally, similarly, in the piston body 14, an annular stepped portion 72a having a lower axis direction height than the seat portion 71b on the side of the seat portion 71b opposite the insertion hole 68. The other ends of the extension-side passages 60a open to the position of the stepped portion 72a.

The damping valve 62a has the above seat portion 71a, and an annular disk 75a that can be simultaneously seated on the whole seat portion 71a, and is a disk valve. The disk 75a is configured as a plurality of annular single-body disks is overlapped with each other. An annular valve regulating member 77a having a smaller diameter than the disk 75a is arranged on the side of the disk 75a opposite the piston body 14.

A fixed orifice 78a is formed between the seat portion 71a and the disk 75a in the damping valve 62a by a groove formed in the seat portion 71a or an opening formed in the disk 75a. The fixed orifice 78a allows the passages 60a to communicate with the lower chamber 13 even if the seat portion 71a and the disk 75a are in an abutting state. The disk 75a opens the passages 60a by being separated from the seat portion 71a. The valve regulating member 77a regulates deformation of the disk 75a more than or equal to a specified value in an opening direction. The damping valve 62a is provided at the passages 60a and suppresses the flow of the oil fluid produced in the passages 60a through the sliding of the piston 11 to generate a damping force.

Similarly, the damping valve 62b has the above-described seat portion 71b, and an annular disk 75b that can be seated on the whole seat portion 71b, and is a disk valve. The disk 75b is also configured as a plurality of annular single-body disks is overlapped with each other. An annular valve regulating member 77b having a smaller diameter than the disk 75b is arranged on the side of the disk 75b opposite the piston body 14. The valve regulating member 77b abuts against an axial step portion 80 of the end portion of the piston rod body 16 on the attachment shaft portion 20 side of the main shaft portion 21.

A fixed orifice 78b is formed between the seat portion 71b and the disk 75b in the damping valve 62b by a groove formed in the seat portion 71b or an opening formed in the disk 75b. The fixed orifice 78b allows the passages 60b to communicate with the upper chamber 12 even if the seat portion 71b and the disk 75b are in an abutting state. The disk 75b opens the passages 60b by being separated from the seat portion 71b. The valve regulating member 77b regulates deformation of the disk 75b more than or equal to a specified value in the opening direction. The damping valve 62b is provided at the passages 60b and suppresses the flow of the oil fluid produced in the passages 60b through the piston 11 to generate a damping force.

Although an example in which the damping valves 62a and 62b are disk valves of inner peripheral clamps is shown in the first embodiment, the damping valves are not limited thereto. The damping valves have only to be mechanisms that generate a damping force, for example, may be lift type valves that biases a disk valve with a spring or may be poppet valves.

The damping force variable mechanism 65 is screwed to the male thread 19 of the tip of the attachment shaft portion 20 of the piston rod body 16. The damping force variable mechanism 65 is a frequency response unit that makes a damping force variable, without being controlled by frequency (vibrational state) from the outside. Additionally, the damping force variable mechanism 65 is constituted by a lid member 82, a housing 85, a free piston 87, an O ring 88, and an O ring 89.

The lid member 82 is formed with a female thread 81 that is screwed to the male thread 19 on one end side of the piston rod body 16. The housing 85 has a substantially cylindrical housing body 83 attached so that one end opening side thereof is blocked by the lid member 82. The free piston 87 is slidably inserted into the housing 85. The O ring 88 is a compression-side elastic body that is interposed between the free piston 87 and the lid member 82 of the housing 85 and that is compressively deformed when the free piston 87 moves toward the lid member 82 in the axial direction with respect to the housing 85. The O ring 89 is a compression-side elastic body that is interposed between the free piston 87 and the lid housing body 83 of the housing 85 and that is compressively deformed when the free piston 87 moves to the side opposite the above with respect to the housing 85.

In FIG. 2, the O rings 88 and 89 in a natural state are shown for convenience. Particularly, since the O ring 89 also functions as a seal, it is desirable that the O ring be arranged so as to be always deformed (non-circular cross-section in an attached state. The above-described O ring 88 (second elastic body) is a resistance element that is compressively deformed to generate a resistance force against the displacement of the free piston 87, when the free piston 87 has moved in a second direction, and the O ring 89 (first elastic body) is a resistance element that is compressively deformed to generate a resistance force against the displacement of the free piston 87, when the free piston 87 has moved in the second direction.

The lid member 82 is formed mainly by cutting work, and has a substantially cylindrical lid inner cylinder portion 91, a disk-shaped lid substrate portion 92 that extends radially outward from an axial end portion of the lid inner cylinder portion 91, a lid outer cylinder portion 93 that extends in the same direction as the lid inner cylinder portion 91 from the outer peripheral side of the lid substrate portion 92, and a lid tip plate portion 95 that covers the tip side of the lid inner cylinder portion 91 and has a passage opening portion (pressure chamber opening) 94 formed at the radial center thereof.

The above-described female thread 81 is formed in an inner peripheral portion of the lid inner cylinder portion 91. The inner peripheral surface of the lid outer cylinder portion 93 has a cylindrical surface portion 96 and a curved surface portion 97 sequentially from the lid substrate portion 92 side. The cylindrical surface portion 96 has a constant diameter, and the curved surface portion 97 connected to the cylindrical surface portion 96 has an annular shape of which the diameter is larger away from the cylindrical surface portion 96. The curved surface portion 97 has a circular-arc cross-section including the central axis of the lid member 82. The outer peripheral surface of the lid outer cylinder portion 93 is formed with a male thread 98. The passage opening portion 94 has a smaller-diameter hole 94A of the lid tip plate portion 95 that is located on the lid substrate portion 92 side and has a constant diameter, and a tapered hole 94B having tapered shape that is provided on the side of the lid tip plate portion 95 opposite the lid substrate portion 92 and is continuous with the smaller-diameter hole 94A away from the lid substrate portion 92.

The housing body 83 is formed mainly by cutting work, and has a substantially cylindrical shape in which an inner annular projection 100 that protrudes radially inward is formed on the first side in the axial direction. A smaller-diameter cylindrical surface portion 101, a curved surface portion 102, a larger-diameter cylindrical surface portion 103, and a female thread 104 are formed in the inner peripheral surface of the housing body 83 sequentially from the first side in the axial direction. The smaller-diameter cylindrical surface portion 101 has a constant diameter, the curved surface portion 102 connected to the smaller-diameter cylindrical surface portion 101 has an annular shape of which the diameter is larger away from the smaller-diameter cylindrical surface portion 101, and the larger-diameter cylindrical surface portion 103 connected to the curved surface portion 102 has a constant diameter that is a larger diameter than the smaller-diameter cylindrical surface portion 101. The curved surface portion 102 has a circular-arc cross-section including the central axis of the housing body 83, and the smaller-diameter cylindrical surface portion 101 and the curved surface portion 102 are formed in the inner annular projection 100. Although the housing body 83 is described to be cylindrical, it is desirable that the inner peripheral surface of the housing body has a circular cross-section, and the outer peripheral surfaces of the housing body may have non-circular cross-sectional shapes, such as a polygonal shape.

As the male thread 98 of the lid member 82 is screwed to the female screw 104 of such a housing body 83, these are integrated and serve as the housing 85. The lid outer cylinder portion 93 of the lid member 82 constitutes an inner annular projection that protrudes radially inward than the larger-diameter cylindrical surface portion 103 in the housing 85, and the curved surface portion 97 is arranged in this portion so as to axially face the curved surface portion 102 of the inner annular projection 100 of the housing body 83.

The free piston 87 has a free piston body 106 and a shutter member 107. The free piston body 106 is formed mainly by cutting work, and has a substantially cylindrical piston cylinder portion 108 and a piston-blocking plate portion 109 that blocks the axial first side of the piston cylinder portion 108. An outer annular projection 110 that has annular shaped protrudes radially outward is formed in the middle of the piston cylinder portion 108 in the axial direction.

A smaller-diameter cylindrical surface portion 113, a curved surface portion 114, a larger-diameter cylindrical surface portion 115, a curved surface portion 116, and a smaller-diameter cylindrical surface portion 117 are formed in the outer peripheral surface of the piston cylinder portion 108 sequentially from the piston-blocking plate portion 109 side in the axial direction. The curved surface portion 114, the larger-diameter cylindrical surface portion 115, and the curved surface portion 116 are formed in the outer annular projection 110.

The smaller-diameter cylindrical surface portion 113 has a constant diameter, and the curved surface portion 114 connected to the smaller-diameter cylindrical surface portion 113 has an annular shape of which the diameter is larger away from the smaller-diameter cylindrical surface portion 113. The larger-diameter cylindrical surface portion 115 connected to the curved surface portion 114 have a constant diameter that is a larger diameter than the smaller-diameter cylindrical surface portion 113. The curved surface portion 114 has a circular-arc cross-section including the central axis of the free piston body 106.

The curved surface portion 116 connected to the larger-diameter cylindrical surface portion 115 has a smaller-diameter annular shape of which the diameter is smaller away from the larger-diameter cylindrical surface portion 115. The smaller-diameter cylindrical surface portion 117 is connected to the curved surface portion 116, and the smaller-diameter cylindrical surface portion 117 has a constant diameter that is the same diameter as the smaller-diameter cylindrical surface portion 113. The curved surface portion 116 has a circular-arc cross-section including the central axis of the free piston body 106. The outer annular projection 110 has a shape that is symmetrical to a plane passing through the middle position in the direction of the axis thereof. In the free piston body 106, a plurality of passage holes 118 that passes through the outer annular projection 110 in the radial direction is formed at intervals in the circumferential direction of the free piston bodies 106, at the middle position of the outer annular projection 110 in the axial direction. An attachment hole 119 that penetrates in the axial direction is formed at the center of the piston-blocking plate portion 109 in the radial direction.

The shutter member 107 has a shutter member body 121, a nut member 122, and a spacer 123. The shutter member body 121 has a head portion 125 and a threaded shaft portion 126 having a smaller diameter than the head portion 125. A cylindrical surface portion 127 and a tapered surface portion 128 are formed on the outer peripheral side of the head portion 125. The cylindrical surface portion 127 is provided on the threaded shaft portion 126 side, and has a constant diameter that is a larger diameter than the threaded shaft portion 126. The tapered surface portion 128 is provided on the side of the cylindrical surface portion 127 opposite the threaded shaft portion 126, is continuous with the cylindrical surface portion 127, and has a smaller-diameter as being away in the axial direction from the cylindrical surface portion 127. The spacer 123 is constituted by a plurality of single plates. By changing the number of spacers 123, tuning can be easily performed.

In the shutter member body 121, the threaded shaft portion 126 is inserted through the attachment hole 119 of the piston-blocking plate portion 109 of the free piston body 106 from the outer annular projection 110 side in the axial direction in a state where the spacer 123 is arranged on the head portion 125 side of the threaded shaft portion 126. In this state, the nut member 122 is screwed to the threaded shaft portion 126 that protrudes from the piston-blocking plate portion 109. Thereby, the spacer 123 and the piston-blocking plate portion 109 are pinched by the nut member 122 and the head portion 125, and as a result, the shutter member 107 is fixed to the piston-blocking plate portion 109. The angle of the tapered surface portion 128 of the head portion 125 is equal to the angle of the tapered hole 94B of the passage opening portion 94 of the housing 85. Additionally, the external diameter of the cylindrical surface portion 127 of the head portion 125 has a larger diameter than the smaller-diameter hole 94A of the passage opening portion 94, and is equal to the maximum diameter of the tapered hole 94B.

The free piston 87 is arranged within the housing 85 such that the head portion 125 of the shutter member 107 is made to face the passage opening portion 94 of the housing 85. In this state, the free piston 87 is slidably fitted into the larger-diameter cylindrical surface portion 103 of the housing body 83 in the larger-diameter cylindrical surface portion 115. Additionally, one smaller-diameter cylindrical surface portion 113 of the free piston 87 is fitted into the smaller-diameter cylindrical surface portion 101 of the housing body 83. The other smaller-diameter cylindrical surface portion 117 of the free piston 87 is slidably fitted into the cylindrical surface portion 96 of the lid outer cylinder portion 93 of the lid member 82. The curved surface portion 102 of the housing body 83 and the curved surface portion 114 of the free piston 87 overlap each other in position in the radial direction thereof in a state where the curved surface portions are arranged in the housing 85. Hence, the curved surface portion 102 of the housing body 83 and the curved surface portion 114 of the free piston 87 face each other in the movement direction of the free piston 87. In addition, the curved surface portion 97 of the lid outer cylinder portion 93 of the lid member 82 and the curved surface portion 116 of the free piston 87 overlap each other in a position in the radial direction thereof. Hence, the curved surface portion 97 of the lid member 82 and the curved surface portion 116 of the free piston 87 face each other in the movement direction of the free piston 87.

The O ring 89 (a natural state is shown in FIG. 2) is arranged between the smaller-diameter cylindrical surface portion 113 and the curved surface portion 114 of the free piston 87 and the curved surface portion 102 and the larger-diameter cylindrical surface portion 103 of the housing body 83, in other words, between the outer annular projection 110 of the free piston 87 and one inner annular projection 100 of the housing 85. The O ring 89 has a circular cross-section including a central axis in a natural state, has an internal diameter that is a smaller diameter than the smaller-diameter cylindrical surface portion 113 of the free piston 87, and has an external diameter that is a larger diameter than the larger-diameter cylindrical surface portion 103 of the housing body 83. That is, the O ring 89 is fitted to both the free piston 87 and the housing 85 with an interference in the radial direction thereof.

Additionally, the O ring 88 (a natural state is shown in FIG. 2) is arranged between the larger-diameter cylindrical surface portion 103 and the curved surface portion 97 of the housing 85 and the curved surface portion 116 and the smaller-diameter cylindrical surface portion 117 of the free piston 87, in other words, between the outer annular projection 110 of the free piston 87 and the lid outer cylinder portion 93 that is the other inner annular projection of the housing. The O ring 88 has a circular cross-section including a central axis in a natural state, has an internal diameter that is a smaller diameter than the diameter of the smaller-diameter cylindrical surface portion 117 of the free piston 87, and has an external diameter that is a larger diameter than the diameter of the larger-diameter cylindrical surface portion 103 of the housing 85. That is, the O ring 88 is also fitted to both the free piston 87 and the housing 85 with an interference in the radial direction thereof.

Both of the O rings 88 and 89 have the same sizes, hold the free piston 87 at a predetermined neutral position with respect to the housing 85, and permit the axial movement to both the upper chamber 12 side and the lower chamber 13 side in the axial direction with respect to the housing 85 of the free piston 87.

In the free piston 87, the O ring 88 contacts the smaller-diameter cylindrical surface portion 117 and the curved surface portion 116, and the curved surface portion 116 among them inclines with respect to the movement direction of the free piston 87. Additionally, in the housing 85, the O ring 88 contacts the larger-diameter cylindrical surface portion 103 and the curved surface portion 97 of the housing 85, and the curved surface portion 97 of them inclines with respect to the movement direction of the free piston 87.

In other words, the outer annular projection 110 is provided at the outer peripheral portion of the free piston 87, and both axial faces of the outer annular projection 110 constitute the curved surface portion 114 and the curved surface portion 116. The inner annular projection 100 having the curved surface portion 102, and the lid outer cylinder portion 93 that constitutes the inner annular projection having the curved surface portion 97 is provided at positions on both sides of the outer annular projection 110 at the inner periphery of the housing 85. The O ring 89 and the O ring 88 are respectively provided between the outer annular projection 110, and the lid outer cylinder portion 93 that constitute the inner annular projection 100 and the inner annular projection.

A free piston contact surface that is a portion that contacts the O ring 89 in the smaller-diameter cylindrical surface portion 113 and the curved surface portion 114 of the free piston 87, and a housing contact surface that is a portion that contacts the O ring 89 in the larger-diameter cylindrical surface portion 103 and the curved surface portion 102 of the housing 85 change depending on the movement of the free piston 87. That is, the shortest distance passing through the center of the O ring between the free piston contact surface and the housing contact surface changes, and the direction of a line segment that connects portions of the shortest distance changes.

In other words, the shapes between the smaller-diameter cylindrical surface portion 113 and the curved surface portion 114 and the larger-diameter cylindrical surface portion 103 and the curved surface portion 102 are set so that the direction of a line segment connecting the shortest distance between the free piston contact surface of the free piston 87 and the housing contact surface of the housing 85 changes. Specifically, when the free piston 87 is located on the upper chamber 12 side (upper side of FIG. 2) in the axial direction with respect to the housing 85, the shortest distance between the free piston contact surface and the housing contact surface is the difference in radius between the larger-diameter cylindrical surface portion 103 and the smaller-diameter cylindrical surface portion 113 (since the difference in radius between the external diameter and the internal diameter of the O ring 89 is more than the difference in radius between the larger-diameter cylindrical surface portion 103 and the smaller-diameter cylindrical surface portion 113, the O ring 89 is crushed by the difference. That is, in that portion, the line segment of the shortest distance has an inclination angle of 0). On the other hand, if the free piston 87 moves toward the lower chamber 13 (lower side of FIG. 2) in the axial direction with respect to the housing 85, the contact portions with the O ring 89 are the curved surface portion 114 and the curved surface portion 102, and the most crushed portion of the O ring 89, that is, the line segment of the shortest distance inclines.

Similarly, a free piston contact surface that is a portion that contacts the O ring 88 in the smaller-diameter cylindrical surface portion 117 and the curved surface portion 116 of the free piston 87, and a housing contact surface that is a portion that contacts the O ring 88 in the larger-diameter cylindrical surface portion 97 and the curved surface portion 103 of the housing 85 change depending on the movement of the free piston 87. That is, the shortest distance between the free piston contact surface and the housing contact surface changes, and the direction of a line segment connecting portions that make the shortest distance changes. In other words, the shapes between the smaller-diameter cylindrical surface portion 117 and the curved surface portion 116 and the larger-diameter cylindrical surface portion 103 and the curved surface portion 97 are set so that the direction of a line segment connecting the shortest distance between the free piston contact surface of the free piston 87 and the housing contact surface of the housing 85 changes. Specifically, when the free piston 87 is located on the lower chamber 13 side (lower side of FIG. 2) in the axial direction with respect to the housing 85, the shortest distance between the free piston contact surface and the housing contact surface is the difference in radius between the larger-diameter cylindrical surface portion 103 and the smaller-diameter cylindrical surface portion 117 (since the difference in radius between the external diameter and the internal diameter of the O ring 88 is more than the difference in radius between the larger-diameter cylindrical surface portion 103 and the smaller-diameter cylindrical surface portion 117, the O ring 88 is crushed by the difference.

That is, in that portion, the line segment of the shortest distance has an inclination angle of 0.). On the other hand, if the free piston 87 moves toward the upper chamber 12 (upper side of FIG. 2) in the axial direction with respect to the housing 85, the contact portions with the O ring 88 are the curved surface portion 97 and the curved surface portion 116, and the most crushed portion of the O ring 88, that is, the line segment of the shortest distance inclines.

The damping force variable mechanism 65 is assembled, for example, by inserting the O ring 89 into the housing body 83 to the position of the curved surface portion 102, fitting the free piston 87 into the housing body 83 and the O ring 89, and inserting the O ring 88 between the housing body 83 and the free piston 87 to the position of the curved surface portion 116, thereby screwing the lid member 82 into the housing body 83. Then, the damping force variable mechanism 65 that is assembled in advance in this way is attached by screwing the female thread 81 to the male thread 19 of the attachment shaft portion 20 of the piston rod body 16. At that time, the lid substrate portion 92 of the housing 85 abuts against the valve regulating member 77a. The external diameter of the damping force variable mechanism 65, that is, the external diameter of the housing 85, is set to be less than the internal diameter of a cylinder 10 but such a degree not to be a flow path resistance.

The piston rod body 16, the lid inner cylinder portion 91 screwed to the piston rod body 16 of the lid member 82, and the lid tip plate portion 95 on an extension of the piston rod body 16 have one end connected to the piston 11 and the other end extending to the outside of the cylinder 10, and constitute the piston rod 130 having the housing 85 provided on one end side thereof, and the lid inner cylinder portion 91 and the lid tip plate portion 95 constitute both the piston rod 130 and the housing 85. Hence, the passage opening portion 94 formed in the lid tip plate portion 95 of the lid member 82 is located at the end face of the piston rod 130 on the cylinder inner end side.

A passage hole 140 along the radial direction is formed at a position of the main shaft portion 21 that is spaced apart by a predetermined distance from the spring receiver 25 that abuts against the retainer 23 in the piston rod body 16 of a piston rod 130, and a passage hole 141 that communicates with the passage hole 140, opens to the tip portion on the attachment shaft portion 20 side, and has a larger diameter than the passage hole 140 is formed along the axial direction. The passage holes 140 and 141, a chamber 142 surrounded by the piston rod body 16, the lid inner cylinder portion 91, and the lid tip plate portion 95, and the passage opening portion 94 constitute a rod passage 146 provided in the piston rod 130. The rod passage 146 allows the upper chamber 12 to communicate with a pressure chamber 145 formed in the housing 85. Hence, the passage opening portion 94 located at the end face of the piston rod 130 constitutes an end portion opening on the pressure chamber 145 side of the rod passage 146. The pressure chamber 145 is formed by the housing 85, the O rings 88 and 89, and the free piston 87.

In the first embodiment, the central axis of the shutter member 107 that is present at the center of the free piston 87 is made to coincide with that of the passage opening portion 94 that is present at the center of the housing 85. The shutter member 107 is spaced apart from the passage opening portion 94 in a state where the head portion 125 is made to partially enter the passage opening portion 94 located at the end face of the piston rod 130, when the free piston 87 is at the neutral position as shown in FIG. 2 within the housing 85.

If the free piston 87 slides within the housing 85 from this neutral position and moves toward the lid member 82, the shutter member 107 of the free piston 87 brings the tapered surface portion 128 of the head portion 125 close to the inner peripheral surface of the tapered hole 94B of the passage opening portion 94. This narrows the rod passage 146. Additionally, if the free piston 87 moves to the side opposite the lid member 82 from this state, the tapered surface portion 128 of the head portion 125 is spaced apart from the inner peripheral surface of the tapered hole 94B of the passage opening portion 94 by a distance according to the movement of the free piston 87. If the shutter member 107 is spaced apart from the passage opening portion 94 by a predetermined distance or more, the passage opening portion 94 is opened with the passage area of the smaller-diameter hole 94A. In this way, the shutter member 107 adjusts the passage area of the passage opening portion 94 depending on the position of the free piston 87 with respect to the housing 85.

Figure 3:
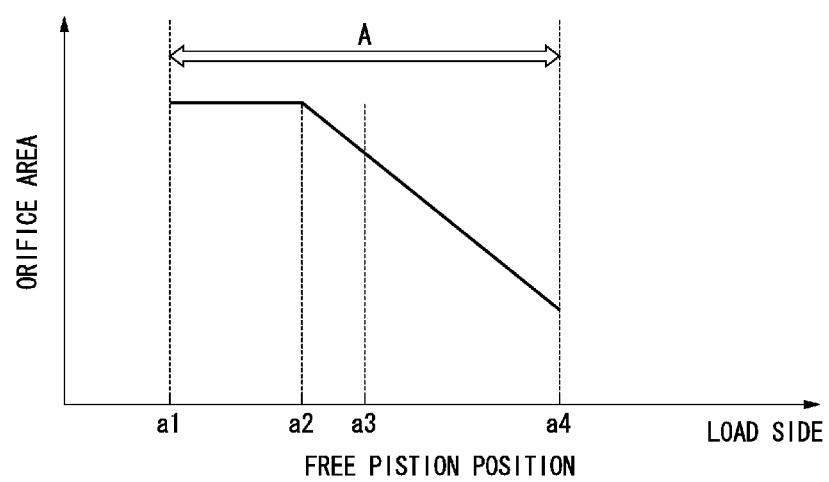
FIG. 3 is a characteristic diagram showing the relationship between the position of a free piston with respect to a housing and the passage area of a variable orifice in the shock absorber of the first embodiment of the present invention.

In other words, the shutter member 107 and the passage opening portion 94 constitute a variable orifice 148 that makes the passage area of the rod passage 146 variable. The characteristics of the variable orifice 148 are shown in FIG. 3. The horizontal axis of FIG. 3 represents the position of the free piston 87 with respect to the housing 85, and the vertical axis of FIG. 3 represents passage area (orifice area). That is, the variable orifice 148 sets the passage area of the rod passage 146 to the greatest constant value in an end region a1 to a2 where the free piston 87 is separated from the piston rod 130 by a predetermined value or more and the shutter member 107 is separated from the passage opening portion 94 by a predetermined value or more, among the movable range of the free piston 87 with respect to the housing 85. Also, in a second-side region a2 to a4 including a neutral position a3 of the free piston 87, the passage area of the rod passage 146 is changed so as to decrease proportionally as the free piston 87 approaches the piston rod 130 and the shutter member 107 is brought close to the passage opening portion 94.

The variable orifice 148 shown in FIG. 2 makes the passage area variable before and after reversal from a compression stroke to an extension stroke at the time of input of low-frequency vibration to the shock absorber, at which the displacement of the free piston 87 with respect to the housing 85 increases.

In other words, the free piston 87 is provided with the shutter member 107 that adjusts the opening area of the passage opening portion 94 of the rod passage 146 according to the movement of the free piston 87. Additionally, the shutter member 107 has a shape capable of protruding from the free piston 87 and entering the passage opening portion 94.

The plurality of passage holes 118 that passes through the outer annular projection 110 of the free piston 87 in the radial direction is formed at the middle position of the outer annular projection 110 in the axial direction, as described above. Thereby, the pressure chamber 145 always communicates with a chamber 150 surrounded by the housing 85, the O ring 88, the O ring 89, and the free piston 87 via the passage holes 118. In other words, the passage holes 118 guide the oil fluid from the pressure chamber 145 to the chamber 150 between the second-side O ring 88 and the first-side O ring 89. In addition, since the passage holes 118 is formed at the position of the outer annular projection 110 of the free piston 87, the passage holes contact neither the second-side O ring 88 nor the first-side O ring 89 in the whole movable range of the free piston 87 with respect to the housing 85.

The above-described rod passage 146 formed by the passage holes 140 and 141, the chamber 142, and the passage opening portion 94 communicate with the upper chamber 12 that is the second side of the upper chamber 12 and the lower chambers 13, and passes the oil fluid from the upper chamber 12 within the cylinder 10 to the pressure chamber 145 through the movement of the piston 11 toward the upper chamber 12. The variable orifice 148 is provided in series with the pressure chamber 145. The O rings 88 and 89 that are provided between the free piston 87 and the housing 85, and are arranged on both sides in the sliding direction of the free piston 87 generate a resistance force against the displacement of the free piston 87. That is, if the free piston 87 moves toward the second-side upper chamber 12 with respect to the housing 85, the O ring 88 generates an elastic force, and if the free piston 87 moves to the lower chamber 13 on the other side with respect to the housing 85, the O ring 89 generates an elastic force.

Here, in an extension stroke where the piston rod 130 moves from the upper chamber 12 to the extension side, the oil fluid flows to the lower chamber 13 via the passages 60a. However, in a case where the piston speed is in an extremely low speed range, the oil fluid introduced into the passages 60a from the upper chamber 12 basically flows to the lower chamber 13 via a normally opened fixed orifice 78a that is formed between the seat portion 71a and the disk 75a that abuts against the seat portion 71a, and a damping force of orifice characteristics (a damping force is approximately proportional to the square of the piston speed mostly) is generated at that time. Additionally, if the piston speed increases and reaches a low speed range, the oil fluid introduced into the passages 60a from the upper chamber 12 basically flow to the lower chamber 13 through between the disk 75a and the seat portions 71a, while opening the disk 75a. For this reason, a damping force with valve characteristics (a damping force is approximately proportional to the piston speed) is generated.

In a compression stroke where the piston rod 130 moves to the compression side, the oil fluid flows from the lower chamber 13 via the passages 60b to the upper chamber 12. However, in a case where the piston speed is in an extremely low speed range, the oil fluid introduced into the passages 60b from the lower chamber 13 basically flows to the upper chamber 12 via a normally opened fixed orifice 78b that is formed between the seat portion 71b and the disk 75b that abuts against the seat portion 71b. For this reason, a damping force with valve characteristics (a damping force is approximately proportional to the square of the piston speed) is generated. Additionally, if the piston speed increases and reaches a low speed range, the oil fluid introduced into the passages 60b from the lower chamber 13 basically flows to the upper chamber 12 through between the disk 75b and the seat portions 71b, while opening the disk 75b. For this reason, a damping force with valve characteristics (a damping force is approximately proportional to the piston speed) is generated.

Here, when the piston speed is slow, for example, the region (for example, 7 Hz or more) where the frequency of the extremely low speed range (for example, 0.05 m/s) is relatively high has vibration that is generated from irregularities of a fine surface of a road surface. In such a situation, it is preferable to reduce the damping force. Additionally, even when the piston speed is similarly slow, a region (for example, 2 Hz or less) where the frequency is relatively low contrary to the above has vibration, such as so-called shaking caused by the rolling of a vehicle body. In such a situation, it is preferable to increase a damping force.

Correspondingly, the above-described damping force variable mechanism 65 makes a damping force variable according to frequency even in a case where the piston speed is slow. That is, if the frequency of reciprocation of the piston 11 becomes high when the piston speed is slow, in an extension stroke, the pressure of the upper chamber 12, and the free piston 87 moves toward the lower chamber 13 in the axial direction with respect to the housing 85 against the biasing force of the O ring 89 on the lower chamber 13 in the axial direction while the oil fluid is made to be introduced from the upper chamber 12 via the rod passage 146 formed by the passage holes 140 and 141, the chamber 142, and the passage opening portion 94 of the piston rod 130 into the pressure chamber 145 of the damping force variable mechanism 65. As the free piston 87 moves toward the lower chamber 13 in the axial direction in this way, the oil fluid is introduced into the pressure chamber 145 from the upper chamber 12 according to the passage area of the variable orifice 148. As a result, the flow rate of the oil fluid, which is introduced into the passages 60a from the upper chamber 12, passes through the damping valve 62a, and flows to the lower chamber 13, decreases, and thereby, the damping force declines. In this way, the free piston 87 makes the volume of the pressure chamber 145 variable through the movement of the piston 11.

In the subsequent compression stroke, the pressure of the lower chamber 13 becomes high. Therefore, the free piston 87 that has moved toward the lower chamber 13 in the axial direction till then moves toward the upper chamber 12 in the axial direction with respect to the housing 85 against the biasing force of the O ring 88 on the upper chamber 12 side in the axial direction, while discharging the oil fluid from the pressure chamber 145 via the rod passage 146 to the upper chamber 12 according to the passage area of the variable orifice 148. As the free piston 87 moves toward the upper chamber 12 in the axial direction in this way, the volume of the lower chamber 13 increases, and the flow rate of the oil fluid, which is introduced into the passages 60b from the lower chamber 13, passes through the damping valve 62b, and flows into the upper chamber 12, decreases. Thereby, the damping force declines.

In a region where the frequency of the piston 11 is high, the frequency of movement of the free piston 87 also becomes high in a following manner. As a result, at every extension stroke, the oil fluid flows to the pressure chamber 145 from the upper chamber 12, and at every compression stroke, the volume of the lower chamber 13 increases as much as the free piston 87 has moved, and a state where a damping force has declined is maintained as described above.

On the other hand, when the piston speed is slow, the frequency of movement of the free piston 87 becomes low in a following manner if the frequency of the piston 11 becomes low. For this reason, in an early stage of an extension stroke, the oil fluid flows to the pressure chamber 145 from the upper chamber 12. Thereafter, however, the free piston 87 compresses the O ring 89 and stops on the lower chamber 13 side in the axial direction with respect to the housing 85, and the oil fluid no longer flow into the pressure chamber 145 from the upper chamber 12. For this reason, the flow rate of the oil fluid, which is introduced into the passages 60a from the upper chamber 12, passes through the damping valve 62a, and flows to the lower chamber 13, does not decrease. As a result, the damping force becomes high.

Even in the subsequent compression stroke, in an early stage of the compression stroke, the volume of the lower chamber 13 increases as much as the free piston 87 has moved with respect to the housing 85. Thereafter, the free piston 87 compresses the O ring 88, stops on the upper chamber 12 side in the axial direction with respect to the housing 85, and no longer influences the volume of the lower chamber 13. Thereby, the flow rate of the oil fluid, which is introduced into the passages 60b from the lower chamber 13, passes through the damping valve 62b, and flows to the upper chamber 12, does not decrease. As a result, the damping force becomes increases.

In the present embodiment, as described above, the O rings 88 and 89 made of a rubber material are used as parts that applies a biasing force to the free piston 87 so as to return to the neutral position. At the neutral position of the free piston 87, the O ring 88 between the free piston 87 and the housing 85 is located between the larger-diameter cylindrical surface portion 103 of the housing body 83 and the smaller-diameter cylindrical surface portion 117 of the free piston 87. The O ring 89 is located between the larger-diameter cylindrical surface portion 103 of the housing body 83 and the smaller-diameter cylindrical surface portion 113 of the free piston 87.

If the free piston 87 moves toward the lower chamber 13 in the axial direction with respect to the housing 85, for example, in the extension stroke from this neutral position, the larger-diameter cylindrical surface portion 103 and the smaller-diameter cylindrical surface portion 113 rotate the O ring 89 so that the larger-diameter cylindrical surface portion 103 of the housing 85 and the smaller-diameter cylindrical surface portion 113 of the free piston 87 roll on each other, that is, the internal diameter side and the external diameter side move in opposite directions. Thereafter, the curved surface portion 102 of the housing 85 on the upper chamber 12 side in the axial direction and the curved surface portion 114 of the free piston 87 on the lower chamber 13 side in the axial direction compress the O ring 89 in the axial and radial directions of the free piston 87, while rolling the O ring. Subsequently, the curved surface portion 102 of the housing 85 on the lower chamber 13 side in the axial direction and the curved surface portion 114 of the free piston 87 on the upper chamber 12 side in the axial direction compress the O ring 89 in the axial and radial directions of the free piston 87. If the free piston 87 moves toward the lower chamber 13 in the axial direction with respect to the housing 85 in the extension stroke from this neutral position, the larger-diameter cylindrical surface portion 103 of the housing 85 and the smaller-diameter cylindrical surface portion 117 of the free piston 87 roll the O ring 88 therebetween and move the O ring toward the lower chamber 13 in the axial direction with respect to the housing 85.

At this time, a region where the O ring 89 is rolled between the larger-diameter cylindrical surface portion 103 of the housing 85 and the smaller-diameter cylindrical surface portion 113 of the free piston 87 and a region where the O ring 89 is rolled between the curved surface portion 102 of the housing 85 and the curved surface portion 114 of the free piston 87 are a rolling region where the O ring 89 rolls at a position spaced apart from a downstream end portion in the movement region of the free piston 87, and a movement region where the O ring 89 moves where the O ring has contacted both the housing 85 and the free piston 87 in the movement direction of the free piston 87, at the position spaced apart from the downstream end portion. This movement is that at least a free piston movement direction downstream end position (lower end position in FIG. 2) of the O ring 89 moves.

Additionally, a region where the O ring 89 is compressed between the curved surface portion 102 of the housing 85 and the curved surface portion 114 of the free piston 87 is a movement direction deformation region where the O ring 89 is elastically deformed in the movement direction of the free piston 87, on the downstream end portion side in the movement region of the free piston 87. The elastic deformation in this movement direction deformation region is deformation that the free piston movement direction upstream end position (upper end position in FIG. 2) of the O ring 89 moves and the downstream end position thereof does not move. Here, the rolling region and the movement region overlap a portion of the movement direction deformation region.

In the subsequent compression stroke, if the free piston 87 moves toward the upper chamber 12 in the axial direction with respect to the housing 85, the curved surface portion 102 of the housing 85 on the lower chamber 13 side in the axial direction and the upper chamber 12 in the axial direction of the curved surface portion 114 of the free piston 87 releases the compression of the O ring 89. Subsequently, the curved surface portion 102 of the housing 85 on the upper chamber 12 side in the axial direction and the curved surface portion 114 of the free piston 87 on the lower chamber 13 side in the axial direction further releases the compression of the O ring 89, while rolling the O ring. Subsequently, the larger-diameter cylindrical surface portion 103 of the housing 85 and the smaller-diameter cylindrical surface portion 113 of the free piston 87 move the O ring 89 toward the upper chamber 12 in the axial direction with respect to the housing 85, while rolling the O ring therebetween. At this time, the larger-diameter cylindrical surface portion 103 of the housing 85 and the smaller-diameter cylindrical surface portion 117 of the free piston 87 also move the O ring 88 toward the upper chamber 12 in the axial direction with respect to the housing 85, while rolling the O ring therebetween. Thereafter, the curved surface portion 97 of the housing 85 on the lower chamber 13 side in the axial direction and the curved surface portion 116 of the free piston 87 on the upper chamber 12 side in the axial direction compress the O ring 88 in the axial and radial directions of the free piston 87, while rolling the O ring. Subsequently, the curved surface portion 97 of the housing 85 on the upper chamber 12 side in the axial direction and the curved surface portion 116 of the free piston 87 on the lower chamber 13 side in the axial direction compress the O ring 88 in the axial and radial directions of the free piston 87.

At this time, a region where the O ring 88 is rolled between the larger-diameter cylindrical surface portion 103 of the housing 85 and the smaller-diameter cylindrical surface portion 117 of the free piston 87 and a region where the O ring 88 is rolled between the curved surface portion 97 of the housing 85 and the curved surface portion 116 of the free piston 87 are a rolling region where the O ring 88 rolls at a position spaced apart from an upstream end portion in the movement region of the free piston 87, and a movement region where the O ring 88 moves where the O ring has contacted both the housing 85 and the free piston 87 in the movement direction of the free piston 87, at the position apart from the upstream end portion. This movement is that at least the upstream end position (upper end position in FIG. 2) of the O ring 88 in a free piston movement direction moves.

Additionally, a region where the O ring 88 is compressed between the curved surface portion 97 of the housing 85 and the curved surface portion 116 of the free piston 87 is a movement direction deformation region where the O ring 88 is elastically deformed of the movement direction of the free piston 87, on the downstream end portion side in the movement region in the free piston 87. The elastic deformation in this movement direction deformation region is deformation that the free piston movement direction downstream end position (lower end position in FIG. 2) of the O ring 88 moves and the upstream end position thereof does not move. Here, the rolling region and the movement region overlap a portion of the movement direction deformation region.

In the extension stroke subsequent to the above, the curved surface portion 97 of the housing 85 on the upper chamber 12 side and the curved surface portion 116 of the free piston 87 on the lower chamber 13 side release the compression of the O ring 88. Subsequently, the curved surface portion 97 of the housing 85 on the lower chamber 13 side and the curved surface portion 116 of the free piston 87 on the upper chamber 12 side further release the compression of the O ring 88, while rolling the O ring. Subsequently, the larger-diameter cylindrical surface portion 103 of the housing 85 and the smaller-diameter cylindrical surface portion 117 of the free piston 87 move the O ring 88 toward the lower chamber 13 in the axial direction with respect to the housing 85, while rolling the O ring therebetween. At this time, the larger-diameter cylindrical surface portion 103 of the housing 85 and the smaller-diameter cylindrical surface portion 113 of the free piston 87 also move the O ring 89 toward the lower chamber 13 in the axial direction with respect to the housing 85, while rolling the O ring therebetween. Then, if the free piston 87 passes through the neutral position, the O rings 88 and 89 are operated similarly to the above.

As described above, the O rings 88 and 89 are crushed in the movement direction in the movement direction deformation region.

Here, the characteristics of load to the displacement of the free piston 87 by the O rings 88 and 89 made of a rubber material are nonlinear characteristics. That is, characteristics close to linearity are given in a predetermined range before and behind the neutral position of the free piston 87. As a result, if this range is exceeded, the increasing rate of load increases smoothly with respect to the displacement. As described above, since the amplitude of the piston 11 is small in the region where the operation frequency of the piston 11 is high, the displacement of the free piston 87 is also small, and the free piston operates in a linear characteristic before and behind the neutral position. Thereby, the free piston 87 becomes easy to move, vibrates following the vibration of the piston 11, and contributes to a reduction in the damping forces generated by the damping valves 62a and 62b.

On the other hand, since the amplitude of the piston 11 is large in the region where the operation frequency of the piston 11 is low, the displacement of the free piston 87 becomes large, and the free piston operates in a nonlinear characteristic range. Thereby, the free piston 87 becomes difficult to move gradually and smoothly, and it becomes difficult to reduce the damping forces generated by the damping valves 62a and 62b.

Figure 4:
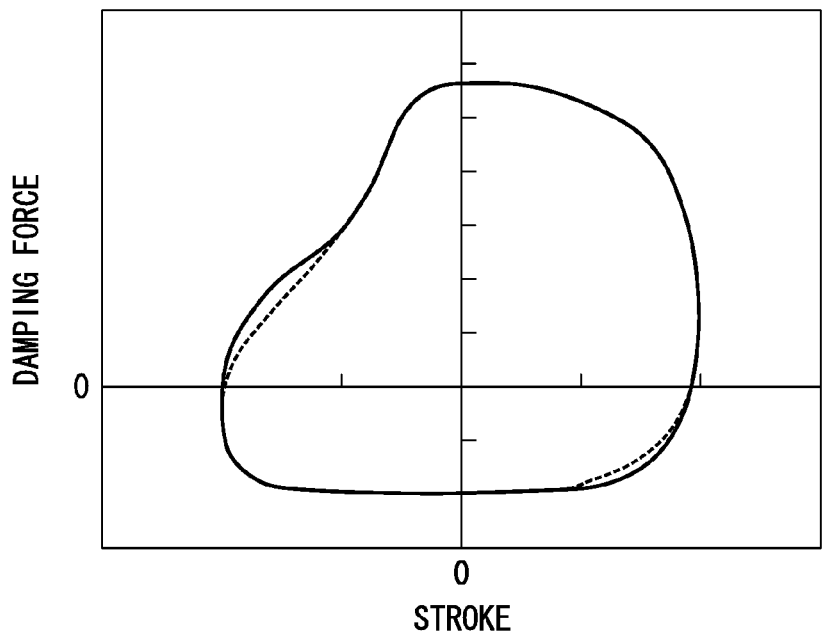
FIG. 4 is a characteristic diagram showing the relationship between a stroke position and a damping force in the shock absorber or the like of the first embodiment of the present invention.
Figure 5:
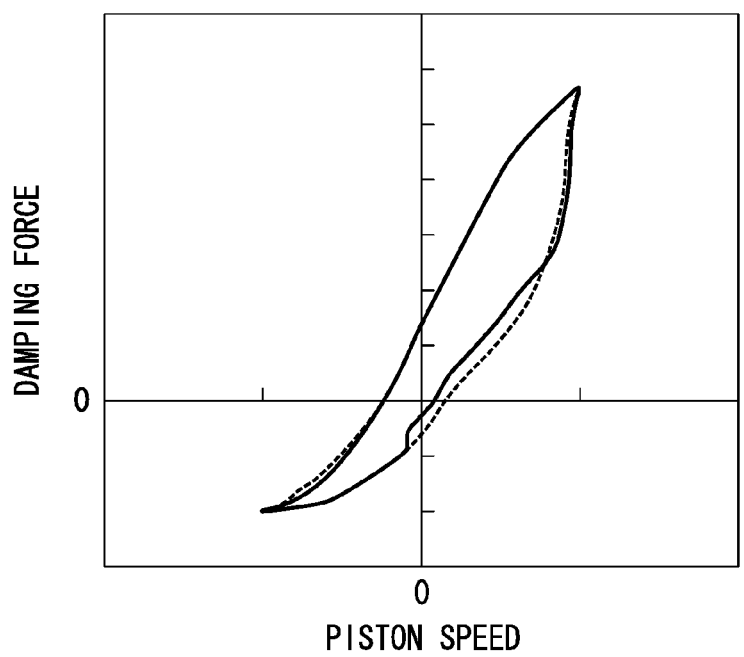
FIG. 5 is a characteristic diagram showing the relationship between a piston speed and a damping force in the shock absorber or the like of the first embodiment of the present invention.

In the first embodiment, as described above, the damping force variable mechanism 65 is provided with the variable orifice 148 that makes the passage area variable before and after reversal from a compression stroke to an extension stroke at the time of input of low-frequency vibration to the shock absorber, at which the displacement of the free piston 87 with respect to the housing 85 increases. For this reason, as shown by a solid line in FIGS. 4 and 5, compared to a case, shown by a broken line, where the variable orifice 148 is not provided, a state where a damping force is high can be maintained in an early stage of the reversal from a compression stroke to an extension stroke shown in FIG. 4. The damping force in a region where the piston speed is low can be increased as shown in FIG. 5.

That is, the variable orifice 148 makes the tapered surface portion 128 of the shutter member 107 approach the inner peripheral surface of the tapered hole 94B of the passage opening portion 94 to narrow the rod passage 146 at the end of a compression stroke where the free piston 87 moves toward the piston rod 130. For this reason, in an early stage of the subsequent extension stroke, the shutter member 107 is in a state where the shutter member has narrowed the rod passage 146. Thereafter, with the progress of the extension stroke, the shutter member is separated from the inner peripheral surface of the tapered hole 94B, and the rod passage 146 is gradually opened to the maximum passage area. As a result, in an early stage of an extension stroke, the rod passage 146 is narrowed as described above. Thus, the flow of the oil fluid from the upper chamber 12 to the pressure chamber 145 is suppressed, and a delay is caused in the movement of the free piston 87 with respect to the housing 85.

Hence, in an early stage of an extension stroke after stroke reversal, the flow rate of the oil fluid, which is introduced into the passages 60a from the upper chamber 12, passes through the damping valve 62a, and flows to the lower chamber 13, relatively increases. Hence, a Lissajous waveform showing the relationship between a stroke and a damping force of the shock absorber is as shown by the solid line in FIG. 4, and the damping force increases compared with the case, shown by the broken line in FIG. 4, where the variable orifice 148 is not provided. Then, if the extension stroke proceeds further, the variable orifice 148 makes the rod passage 146 the greatest passage area, and the damping force variable mechanism 65 operates similarly to the state where the variable orifice 148 is not provided.

Figure 6:
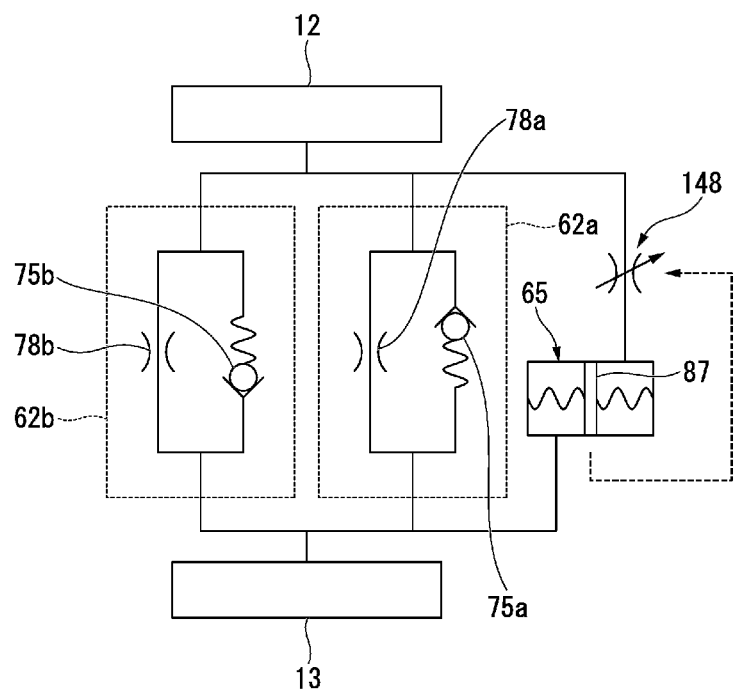
FIG. 6 is a hydraulic circuit diagram of the shock absorber of the first embodiment of the present invention.

In the hydraulic circuit diagram of the first embodiment having the above configuration, as shown in FIG. 6, the damping valve 62a on the extension side, the damping valve 62b on the compression side, and the damping force variable mechanism 65 are provided in parallel between the upper chamber 12 and the lower chamber 13. The variable orifice 148 controlled by the free piston 87 of the damping force variable mechanism 65 is provided on the upper chamber 12 side of the damping force variable mechanism 65.

In the above-described Japanese Unexamined Utility Model Application, First Publication No. H7-19642, a damping force is made variable by forming a passage out of which the working fluid flows out through the inside of the piston rod from the chamber on the first side within the cylinder through the movement of the piston, and providing the free piston that form this passage on the upstream side and the downstream side.

On the other hand, according to the first embodiment described above, a damping force is made variable by forming the rod passage 146 that allows the pressure chamber 145 formed by the free piston 87 within the housing 85 of the damping force variable mechanism 65 to communicate with the upper chamber 12 within the cylinder 11, and by making the volume of the pressure chamber 145 variable using the free piston 87. In addition, the free piston 87 is provided with the shutter member 107 that adjusts the opening area of the passage opening portion 94 of the rod passage 146 according to the movement of the free piston 87. For this reason, it is possible to control the damping force characteristics more finely. That is, in addition to the control using the damping force variable mechanism 65, the displacement of the free piston 87 with respect to the housing 85 after stroke reversal can be delayed by narrowing the opening area of the passage opening portion 94 of the rod passage 146 using the shutter member 107 at the time of stroke reversal from a compression stroke to an extension stroke. For this reason, the damping force in an early stage of reversal to an extension stroke can be increased. Accordingly, degradation of the response of handling resulting from rising degradation in an early stage of stroke reversal of a damping force generated in a case where the shutter member 107 is not provided can be prevented, and the response at the time of stroke reversal from a compression stroke to an extension stroke can be enhanced. Moreover, improvement in the response of handling and improvement in maneuvering stability can be achieved.

Additionally, since the passage opening portion 94 of the rod passage 146 opens to the end face of the piston rod 130, and the shutter member 107 has a shape capable of protruding from the free piston 87 and entering the passage opening portion 94, it is possible to adjust the passage area of the rod passage 146 with simple and compact structure.

Additionally, since the O rings 88 and 89 are provided as resistance elements that generate resistance forces against the displacement of the free piston 87, a damping force can be smoothly changed in a case where the damping force can be changed in response to the operation frequency of the piston 11.

Additionally, the shortest distance passing through the centers of the O rings, between the free piston contact surface that is a portion that contacts the O ring 89 in the smaller-diameter cylindrical surface portion 113 and the curved surface portion 114 of the free piston 87, and the housing contact surface that is a portion that contacts the O ring 89 in the larger-diameter cylindrical surface portion 103 and the curved surface portion 102 of the housing 85 change depending on the movement of the free piston 87, and the direction of a line segment connects the portions that makes a shortest distance changes. The shortest distance between the free piston contact surface that is a portion that contacts the O ring 88 in the smaller-diameter cylindrical surface portion 117 and the curved surface portion 116 of the free piston 87, and the housing contact surface that is a portion that contacts the O ring 88 in the larger-diameter cylindrical surface portion 103 and the curved surface portion 97 of the housing 85 change depending on the movement of the free piston 87, and the direction of a line segment connects the portions that connects portions of a shortest distance changes. Thereby, a damping force can be smoothly changed in a case where the damping force is changed in response to frequency.

Since the O ring 88 that is compressively deformed when the free piston 87 has moved in the second direction and the O ring 89 that is compressively deformed when the free piston 87 has moved in the first direction are provided, a damping force can be smoothly changed in both an extension stroke and a compression stroke. Thereby, since a damping force changes smoothly even in a change in frequency, a change in piston speed, or the like, there is no sense of discomfort of ride quality caused by a change in damping force. Moreover, the damping force increases gradually depending a change in posture. As a result, a posture change can be suppressed without causing a driver to be uncomfortable, and it is possible to provide a vehicle having ride comfort and maneuvering stability and having a higher level as compared to those described in Japanese Unexamined Utility Model Application, First Publication No. H7-19642.

In the first embodiment, the passage opening portion of the variable orifice 148 may be formed so as to pass through in the lid inner cylinder portion 91 of the housing 85 in the radial direction, and the shutter member may be formed in a cylindrical shape that rises up from the piston-blocking plate portion 109 of the free piston 87, and opens and closes the passage opening portion.

Second Embodiment

Next, a second embodiment will be described with reference to FIGS. 7 and 8 and mainly about differences from the first embodiment will be mainly described. In addition, parts common to those of the first embodiment are designated by the same terms and the same symbols.

Figure 7:
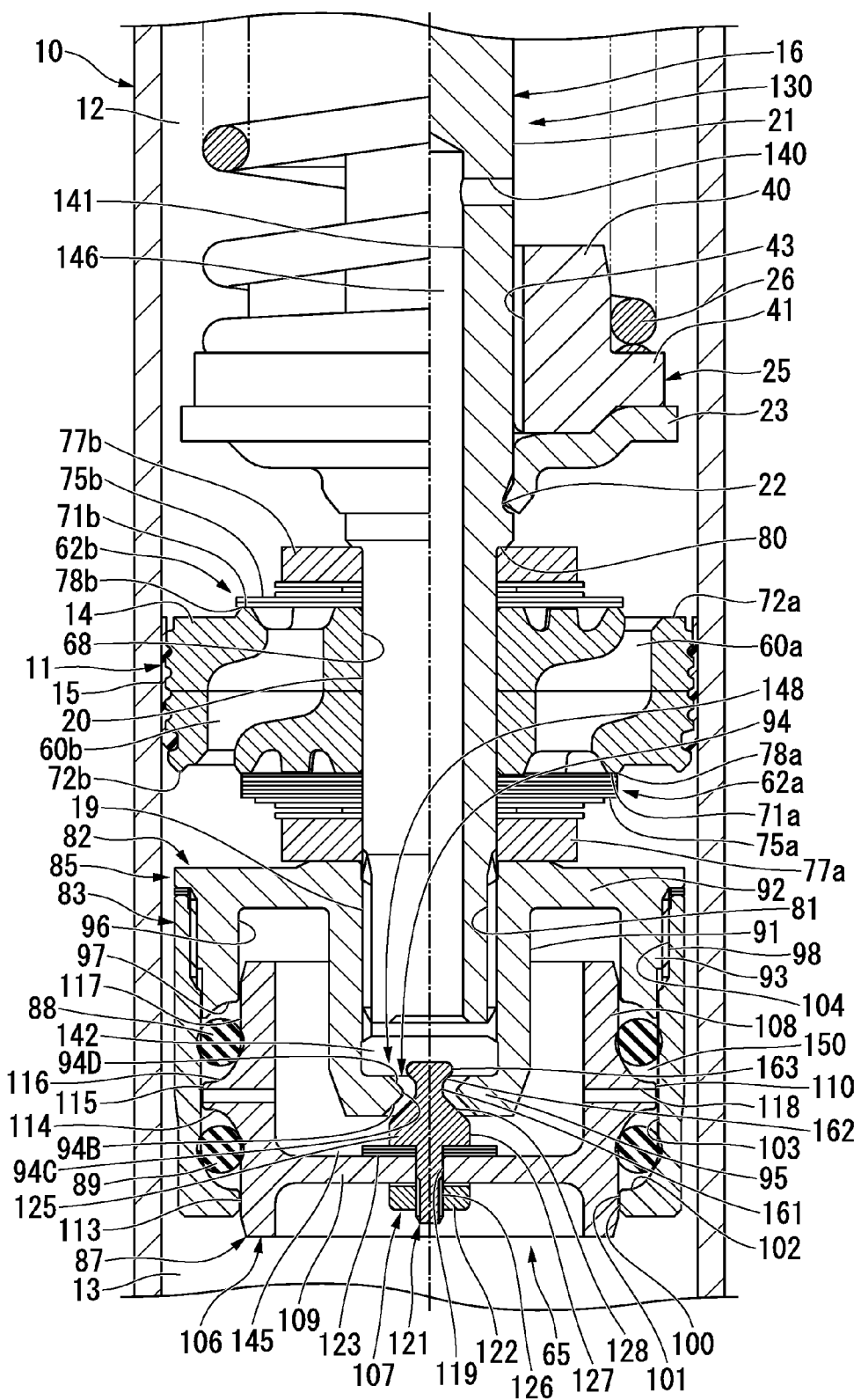
FIG. 7 is a cross-sectional view showing main parts of a shock absorber of a second embodiment of the present invention.

In the second embodiment, as shown in FIG. 7, the variable orifice 148 in which partial alterations are performed on the first embodiment is used.

The passage opening portion 94 of the variable orifice 148 of the second embodiment is formed by the same tapered hole 94B as the first embodiment, the smaller-diameter hole 94C with a constant diameter, which is located on the lid substrate portion 92 side of the tapered hole 94B, and a tapered hole 94D that is located on the lid substrate portion 92 side of the smaller-diameter hole 94C and has a larger diameter toward the lid substrate portion 92 side.

Additionally, the head portion 125 of the shutter member body 121 has a smaller-diameter cylindrical surface portion 161, a tapered surface portion 162, and a face portion 163. In addition to the same cylindrical surface portion 127 and tapered surface portion 128 as those of the first embodiment, the smaller-diameter cylindrical surface portion 161 is continuous with the side of the tapered surface portion 128 opposite the cylindrical surface portion 127, and has a constant diameter that is a smaller diameter than the cylindrical surface portion 127. The tapered surface portion 162 is continuous with the side of the smaller-diameter cylindrical surface portion 161 opposite the tapered surface portion 128, and has a taper shape that is a larger diameter away from the smaller-diameter cylindrical surface portion 161. The face portion 163 is continuous with the side of the tapered surface portion 162 opposite the smaller-diameter cylindrical surface portion 161, and has a constant diameter that is a larger diameter than the smaller-diameter cylindrical surface portion 161 and a smaller diameter than the cylindrical surface portion 127.

In the second embodiment having the above configuration, the shutter member 107 is made to enter the passage opening portion 94 of the piston rod 130 when the free piston 87 is at the neutral position, as shown in FIG. 7, within the housing 85. Specifically, the smaller-diameter hole 94C and the smaller-diameter cylindrical surface portion 161 are aligned in the axial direction, the tapered surface portion 128 is made to face the inner peripheral surface of the tapered hole 94B, and the tapered surface portion 162 is made to face the inner peripheral surface of the tapered hole 94D. Then, if the free piston 87 moves toward the lid member 82 within the housing 85 from this neutral position, the shutter member 107 spaces the tapered surface portion 162 spaced apart from the inner peripheral surface of the tapered hole 94D of the passage opening portion 94 and makes the tapered surface portion 128 approach the inner peripheral surface of the tapered hole 94B. This narrows the rod passage 146. Then, if the free piston 87 moves to the side opposite the lid member 82 from the neutral position, the shutter member 107 spaces the tapered surface portion 128 spaced apart from the inner peripheral surface of the tapered hole 94B of the passage opening portion 94 and makes the tapered surface portion 162 approach the inner peripheral surface of the tapered hole 94D. This narrows the rod passage 146.

Figure 8:
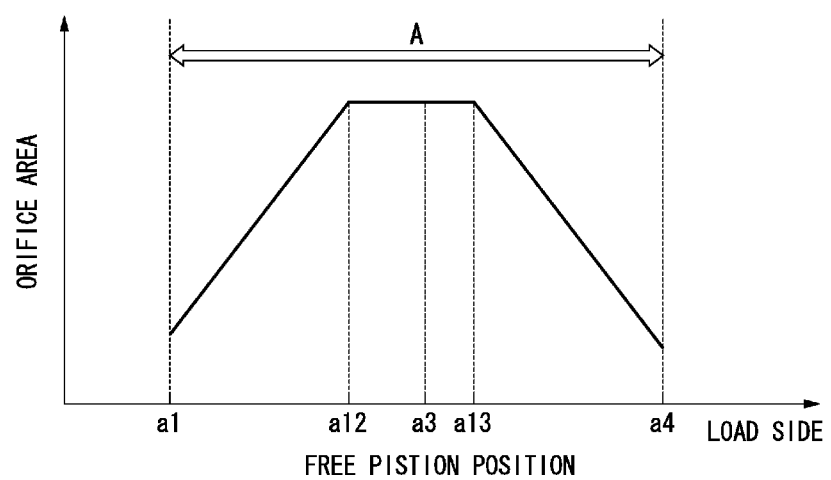
FIG. 8 is a characteristic diagram showing the relationship between the position of a free piston with respect to a housing and the passage area of a variable orifice in the shock absorber of the second embodiment of the present invention.

The characteristics of the variable orifice 148 of the second embodiment are shown in FIG. 8. The horizontal axis of FIG. 8 represents the position of the free piston 87 with respect to the housing 85, and the vertical axis of FIG. 8 represents passage area (orifice area).

That is, the variable orifice 148 of the second embodiment sets the passage area of the rod passage 146 to the greatest constant value in a middle region a12 to a13 including the neutral position a3 of the free piston 87, among the movable range A of the free piston 87 with respect to the housing 85, and changes the passage area of the rod passage 146 so as to decrease proportionally as the free piston 87 is separated from the piston rod 130, in one end region a1 to a12 where the free piston 87 is separated from the piston rod 130 by a predetermined value or more. Additionally, in the other end region a13 to a4 where the free piston 87 approaches the piston rod 130 by a predetermined value or more, the passage area of the rod passage 146 is changed so as to decrease proportionally as the free piston 87 approaches the piston rod 130.

Hence, the variable orifice 148 of the second embodiment makes the passage area variable before and after reversal from a compression stroke to an extension stroke and before and after reversal from an extension stroke to a compression stroke, at the time of input of low-frequency vibration to the shock absorber, at which the displacement of the free piston 87 with respect to the housing 85 increases.

That is, the variable orifice 148 of the second embodiment, similarly to the first embodiment, makes the tapered surface portion 128 of the shutter member 107 approach the inner peripheral surface of the tapered hole 94B of the passage opening portion 94 to narrow the rod passage 146 at the end of a compression stroke where the free piston 87 moves toward the piston rod 130. For this reason, in an early stage of the subsequent extension stroke, the shutter member 107 is in a state where the shutter member has narrowed the rod passage 146. As a result, the movement of the free piston 87 with respect to the housing 85 is delayed.

Hence, in an early stage of an extension stroke after stroke reversal, the flow rate of the oil fluid that flows through the rod passage 146 is suppressed, and the flow rate of the oil fluid, which is introduced into the passages 60a from the upper chamber 12, passes through the damping valve 62a, and flows to the lower chamber 13, increases relatively. Hence, a damping force is increased compared to a case where the variable orifice 148 is not provided.

Additionally, the variable orifice 148 of the second embodiment makes the tapered surface portion 162 of the shutter member 107 approach the inner peripheral surface of the tapered hole 94D of the passage opening portion 94 to narrow the rod passage 146 at the end of a compression stroke where the free piston 87 moves to a side opposite the piston rod 130. For this reason, in an early stage of the subsequent compression stroke, the shutter member 107 is in a state where the shutter member has narrowed the rod passage 146. As a result, the movement of the free piston 87 with respect to the housing 85 is delayed.

Hence, in an early stage of a compression stroke after stroke reversal, the flow rate of the oil fluid that flows through the rod passage 146 is suppressed, and the flow rate of the oil fluid, which is introduced into the passages 60b from the lower chamber 13, passes through the damping valve 62b, and flows to the upper chamber 12, increases relatively. Hence, a damping force is increased compared to a case where the variable orifice 148 is not provided.

According to the second embodiment described above, the displacement of the free piston 87 with respect to the housing 85 after stroke reversal can be delayed by narrowing the opening area of the passage opening portion 94 of the rod passage 146 using the shutter member 107 even at the time of stroke reversal from an extension stroke to a compression stroke, in addition to at the time of stroke reversal from a compression stroke to an extension stroke. As a result, the damping force in an early stage of reversal to a compression stroke can also be increased. Thereby, the response both at the time of stroke reversal from a compression stroke to an extension stroke and the response at the time of stroke reversal from an extension stroke to a compression stroke can be enhanced, the response of handling can be improved, and maneuvering stability can be improved.

Third Embodiment

Next, a third embodiment will be described with reference to FIGS. 9 to 11 mainly about differences from the second embodiment. In addition, parts common to those of the second embodiment are designated by the same terms and the same symbols.

Figure 9:
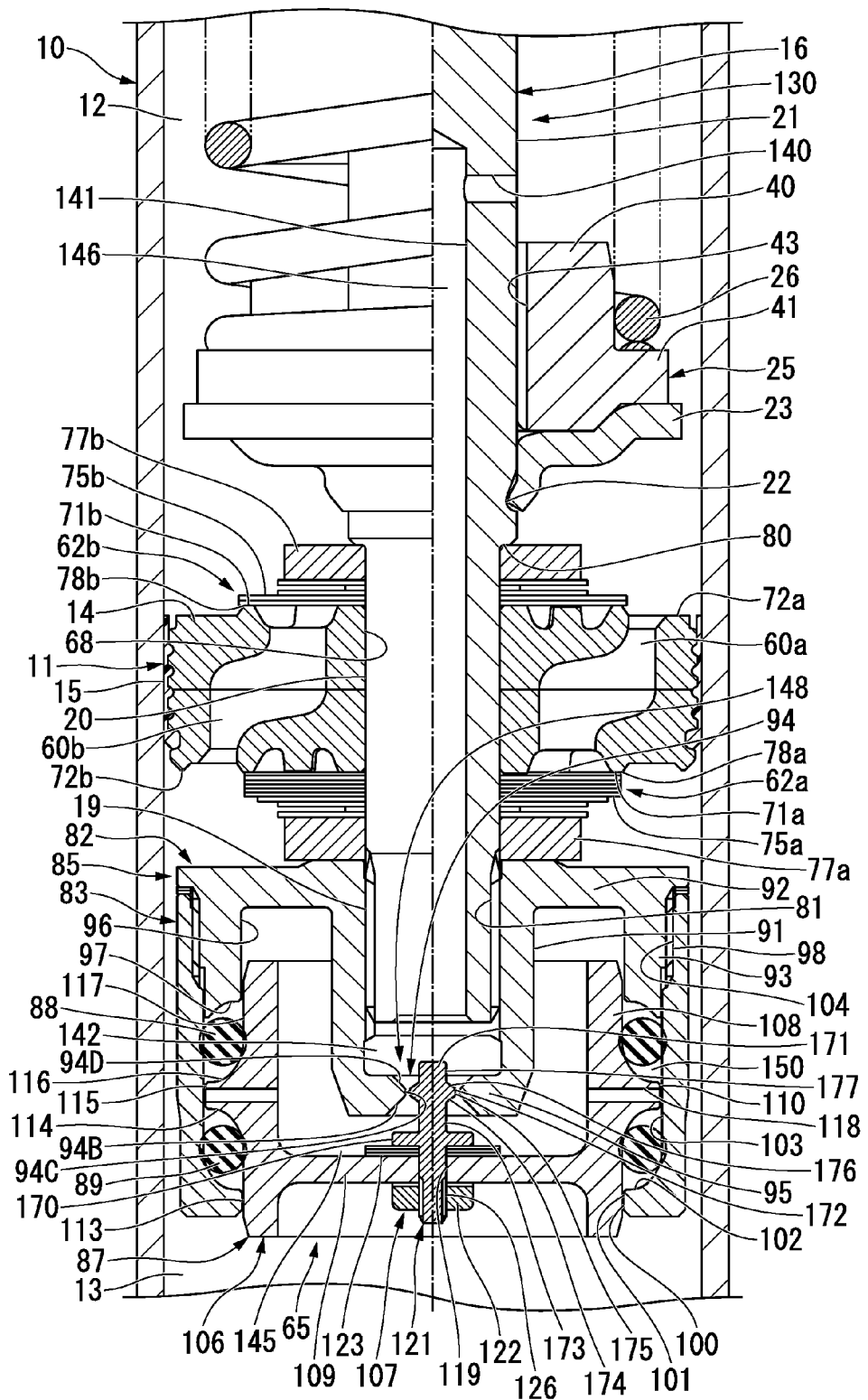
FIG. 9 is a cross-sectional view showing main parts of a shock absorber of a third embodiment of the present invention.

In the third embodiment, as shown in FIG. 9, the variable orifice 148 in which partial alterations are performed on the second embodiment is used. The passage opening portion 94 of the variable orifice 148 of a third embodiment is formed by the same tapered hole 94B, smaller-diameter hole 94C, and tapered hole 94D as those of the second embodiment.

Additionally, the shutter member body 121 has a flange portion 170 that pinches the spacer 123 and the piston-blocking plate portion 109 together with the nut member 122, and a shaft portion 171 on the side of the flange portion 170 opposite the threaded shaft portion 126. The shaft portion 171 has an annular circular larger-diameter portion 172 that protrudes radially outward from an intermediate position. That is, the shaft portion 171 has a cylindrical surface portion 173 with a constant diameter that is a smaller-diameter than the flange portion 170, a tapered surface portion 174 that has as a larger diameter away from the cylindrical surface portion 173, a larger-diameter cylindrical surface portion 175 with a constant diameter that is a larger diameter than the cylindrical surface portion 173, a tapered surface portion 176 that has a smaller-diameter away from the larger-diameter cylindrical surface portion 175, and a cylindrical surface portion 177 with a constant diameter that is the same diameter as the cylindrical surface portion 173, sequentially from the flange portion 170 side.

In the third embodiment having the above configuration, the shutter member 107 is made to enter the passage opening portion 94 of the piston rod 130 when the free piston 87 is at the neutral position, as shown in FIG. 9, within the housing 85. Specifically, the larger-diameter portion 172 and the smaller-diameter hole 94C are aligned in the axial direction. Hence, the passage area of the rod passage 146 is minimized. Then, if the free piston 87 moves toward the piston rod 130 within the housing 85 from this neutral position, the shutter member 107 makes the larger-diameter portion 172 spaced apart from the smaller-diameter hole 94C of the passage opening portion 94 to the tapered hole 94D side. This widens the rod passage 146. Additionally, if the free piston 87 moves to a side opposite the piston rod 130 from the neutral position, the shutter member 107 makes the larger-diameter portion 172 spaced apart from the smaller-diameter hole 94C of the passage opening portion 94 to the tapered hole 94B side. This widens the rod passage 146.

Figure 10:
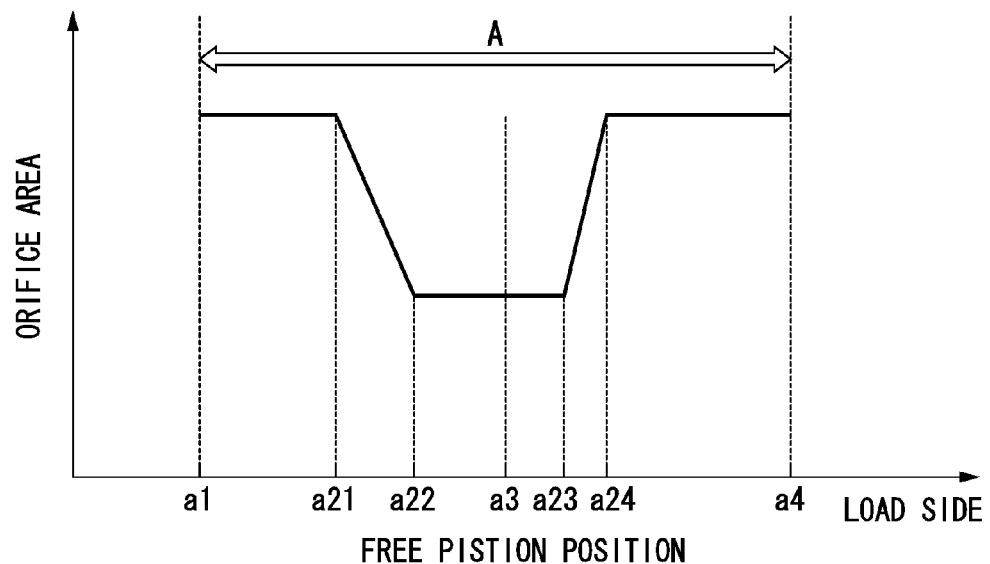
FIG. 10 is a characteristic diagram showing the relationship between the position of a free piston with respect to a housing and the passage area of a variable orifice in the shock absorber of the third embodiment of the present invention.
Figure 11:
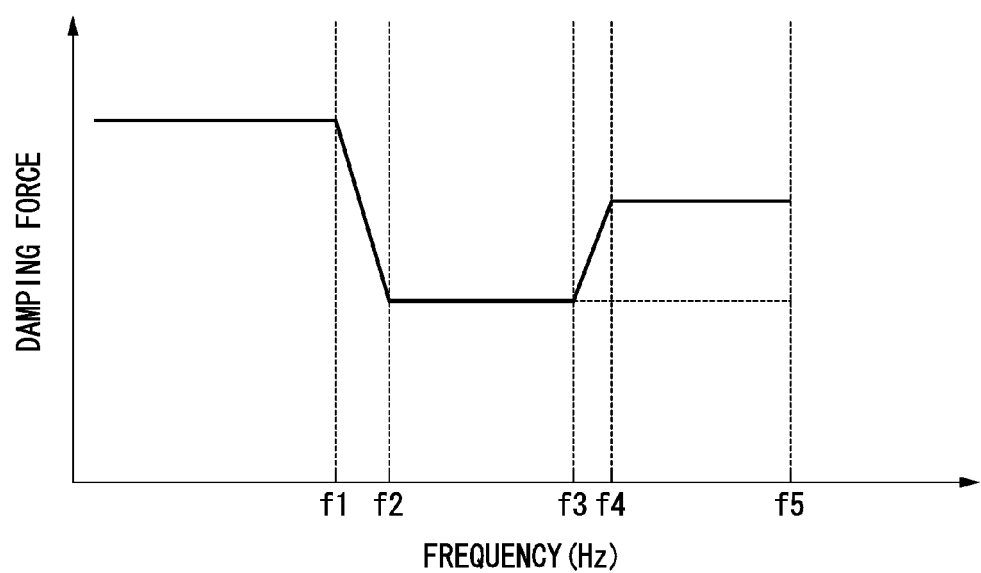
FIG. 11 is a characteristic diagram showing the relationship between a frequency at a constant piston speed and a damping force in the shock absorber or the like of the first embodiment of the present invention.

The characteristics of the variable orifice 148 of the third embodiment are shown in FIG. 10. The horizontal axis of FIG. 10 represents the position of the free piston 87 with respect to the housing 85, and the vertical axis of FIG. 10 represents passage area (orifice area). That is, the variable orifice 148 of the third embodiment sets the passage area of the rod passage 146 to the smallest constant value in a middle region a22 to a23 including the neutral position a3 of the free piston 87, among the movable range A of the free piston 87 with respect to the housing 85, and sets the passage area of the rod passage 146 to the greatest constant value in one end region a1 to a21 and the other end region a24 to a4 where the free piston 87 is separated from the piston rod 130 by a predetermined value or more. Additionally, in a first-side region a21 to a22 between the end region a1 to a21 and the middle region a22 to a23, the passage area of the rod passage 146 is changed so as to increase proportionally as the free piston 87 is separated from the piston rod 130. Additionally, in a second-side region a23 to a24 between the other end region a24 to a4 and the middle region a22 to a23, the passage area of the rod passage 146 is changed so as to increase proportionally as the free piston 87 approaches the piston rod 130.

In such a variable orifice 148 of the third embodiment, when the free piston 87 passes through the neutral position at the time of stroke reversal from an extension stroke to a compression stroke and at the time of stroke reversal from a compression stroke to an extension stroke, the passage area of the rod passage 146 is narrowed and the movement speed of the pulley piston 87 becomes slow. For this reason, as a result, damping forces in early stages of an extension side and a compression side can be increased similarly to the second embodiment. Thereby, the response both at the time of stroke reversal from a compression stroke to an extension stroke and the response at the time of stroke reversal from an extension stroke to a compression stroke can be enhanced, the response of handling can be improved, and maneuvering stability can be improved.

In addition, since the passage area of the rod passage 146 at the neutral position is small, a damping force can be increased similarly to a case where the passage area of the rod passage 146 is small, in a high-frequency region where the displacement of the pulley piston 87 is small and is kept in the vicinity of the neutral position. That is, in a state where the speed of the piston 11 is constant, as shown in FIG. 11, a damping force in a region 0 to f1 (for example, 2 Hz or lower) where the frequency is low is set to a high constant value, and a damping force in a region f1 to f2 where the frequency is higher than that in this region is proportionally decreased as the frequency becomes high. A damping force in a region f2 to f3 (for example, 5 to 10 Hz) where the frequency is higher than this region is set to the lowest value, and a damping force in a region f3 to f4 where the frequency is higher than that in this region is proportionally increased as the frequency becomes high. The damping force is made variable so that a damping force in a region f4 to f5 (for example, 13 to 15 Hz) where the frequency is higher than this region is lower than that in the region 0 to f1 and is constant and higher than that in the region f2 to f3. A broken line portion of the region f4 to f5 shows a damping force in a case where there is no variable orifice 148.

According to the third embodiment described above, a damping force can be made high in a low frequency band so as to suppress occurrence of a spongy feeling and improve maneuvering stability, a damping force can be made low in a middle wave band so as to suppress occurrence of a stiff feeling, and a moderate damping force can be generated in a high-frequency band in the vicinity of sprung resonance so as to improve sprung damping performance. Accordingly, compatibility between improvement in a higher order of ride quality and improvement in maneuvering stability can be achieved.

Fourth Embodiment

Figure 12:
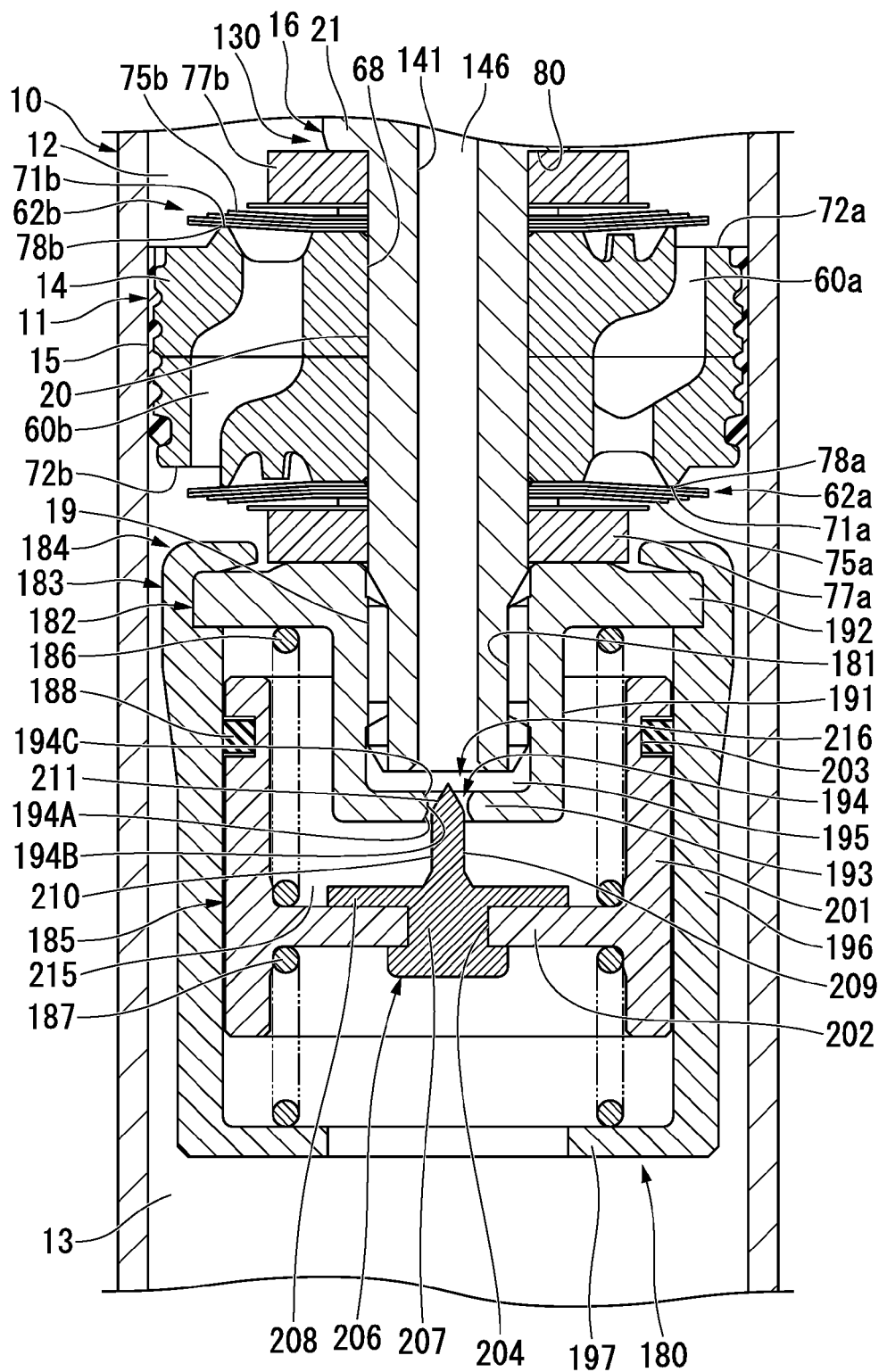
FIG. 12 is a cross-sectional view showing main parts of a shock absorber of a fourth embodiment of the present invention.

Next, a fourth embodiment will be described with reference to FIG. 12 mainly about differences from the first embodiment. In addition, parts common to those of the first embodiment are designated by the same terms and the same symbols.

In the fourth embodiment, a damping force variable mechanism 180 different from the first embodiment is used. The damping force variable mechanism 180, similarly to the damping force variable mechanism 65 of the first embodiment, is a frequency response unit that makes a damping force variable, without being controlled by a frequency (vibrational state) from the outside.

The damping force variable mechanism 180 has a lid member 182, a housing 184, a free piston 185, a metallic coil spring 186, a metallic coil spring 187, and a seal ring 188. The lid member 182 is formed with a female thread 181 that is screwed to the male thread 19 of the piston rod body 16. The housing 184 has a substantially cylindrical housing body 183 attached so that one end opening side thereof is blocked by the lid member 182. The free piston 185 is slidably fitted into the housing 184. The coil spring 186 is a compression-side elastic body that is interposed between the free piston 185 and the lid member 182 of the housing 184 and that is compressively deformed when the free piston 185 moves toward the lid member 182 in the axial direction with respect to the housing 184. The coil spring 187 is a compression-side elastic body that is interposed between the free piston 185 and the lid housing body 183 of the housing 184 and that is compressively deformed when the free piston 185 moves to the side opposite the above with respect to the housing 184. The seal ring 188 is held by the free piston 185 to seal a gap between the free piston and the housing 184.

The coil spring 186 is a resistance element that is compressively deformed to generate a resistance force against the displacement of the free piston 185, when the free piston 185 has moved in the second direction, and the coil spring 187 is a resistance element that is compressively deformed to generate a resistance force against the displacement of the free piston 185, when the free piston 185 has moved in the first direction.

The lid member 182 is formed mainly by cutting work. The lid member 182 has a substantially cylindrical, lid cylindrical portion 191 formed with a female thread 181, a lid disk-shaped flange portion 192 that extends radially outward from one end portion of the lid cylindrical portion 191 in the axial direction, and a plate-shaped lid tip plate portion 193 that extends radially inward from the other end portion of the lid cylindrical portion 191 in the axial direction. A passage opening portion (pressure chamber opening) 194 is formed at the center of the lid tip plate portion 193. The passage opening portion 194 has a tapered hole 194A that is located on the side opposite the lid flange portion 192 and has a smaller diameter toward the lid flange portion 192, a smaller-diameter hole 194B with a constant diameter, which is continuous with the lid flange portion 192 side of the tapered hole 194A, and a tapered hole 194C that is continuous with the lid flange portion 192 side of the smaller-diameter hole 194B, and has a larger diameter toward the lid flange portion 192.

The lid member 182 is screwed to the male thread 19 of the piston rod body 16 in the female thread 181, and abuts against the valve regulating member 77a in the lid flange portion 192. Similarly to the first embodiment, the piston rod 130 is constituted by the lid cylindrical portion 191 and the lid tip plate portion 193, and the piston rod body 16, and the passage opening portion 194 is located at the end face on the cylinder inner end side of the piston rod 130. A chamber 195 surrounded by the piston rod body 16, the lid inner cylinder portion 191, and the lid tip plate portion 193, and the passage opening portion 194 constitute a portion of the rod passage 146 that is provided in the piston rod 130 and communicates with the upper chamber 12.

Since the housing body 183 is formed mainly by cutting work, the housing body has a shape in which an inner flange portion 197 is formed on the first side of a cylindrical portion 196 in the axial direction. The lid flange portion 192 of the lid member 182 is fitted to the side of the housing body 183 opposite the inner flange portion 197. As the housing body 183 is swaged in this state, the housing body 183 and the lid member 182 are integrated to constitute the housing 184.

The free piston 185 is formed mainly by cutting work. The free piston body 185 has a substantially cylindrical piston cylinder portion 201 and a piston-blocking plate portion 201 that blocks the axial first side of the piston cylinder portion 202. A seal groove 203 that holds the seal ring 188 is formed in the outer peripheral surface of the piston cylinder portion 201 opposite the piston-blocking plate portion 202 in the axial direction. An attachment hole 204 is formed at the radial center of the piston-blocking plate portion 202 so as to penetrate in the axial direction.

A shutter member 206 is attached to the attachment hole 204 of the free piston 185. The shutter member 206 has a swaged shaft portion 207 that is swaged in a fitted state into the attachment hole 204, a flange portion 208 that abuts against the piston-blocking plate portion 202, and a shaft portion 209 on the side of the flange portion 208 opposite the swaged shaft portion 207. The shaft portion 209 has a cylindrical surface portion 210 with a constant diameter, and a tapered surface portion 211 that is located on the side of the cylindrical surface portion 210 opposite the flange portion 208, is continuous with the cylindrical surface portion 210, and has a smaller-diameter away in the axial direction from the cylindrical surface portion 210.

The free piston 185 is slidably fitted into the cylindrical portion 196 of the housing body 183 in a state where the free piston is arranged within the housing 184. Inside the piston cylinder portion 201 of the free piston 185, the coil spring 186 is arranged between the piston-blocking plate portion 202 and the lid flange portion 192, and the coil spring 187 is arranged between the piston-blocking plate portion 202 and the inner flange portion 197. The free piston 185, as shown in FIG. 12, is located at a predetermined neutral position within the housing 184 by the biasing forces of the coil springs 186 and 187, and at this time, the shaft portion 209 of the shutter member 206 enters the passage opening portion 194.

The portion that is surrounded by the free piston 185, the cylindrical portion 196 of the housing body 183, the lid member 182, and the seal ring 188 and that communicates with the rod passage 146 is the pressure chamber 215 capable of communicating with the upper chamber 12.

In the damping force variable mechanism 180 of the fourth embodiment, for example, in an extension stroke, the free piston 185 moves toward the lower chamber 13 in the axial direction with respect to the housing 184 while extending the coil spring 186 on the upper chamber 12 side in the axial direction and compressing the coil spring 187 on the lower chamber 13 side in the axial direction, and introduces the oil fluid on the upper chamber 12 into the pressure chamber 215 via the rod passage 146.

Additionally, in a compression stroke, the free piston 185 moves toward the upper chamber 12 in the axial direction with respect to the housing 184 while extending the coil spring 187 on the lower chamber 13 side in the axial direction and compressing the coil spring 186 on the upper chamber 12 side in the axial direction from the pressure chamber 215, and discharges the oil fluid of the pressure chamber 215 toward the upper chamber 12 via the rod passage 146.

Then, if the free piston 185 slides within the housing 184 from the neutral position and moves toward the lid member 182, the shutter member 206 of the free piston 185 locates the cylindrical surface portion 210 of the shaft portion 209 within the smaller-diameter hole 194B of the passage opening portion 194. This narrows the rod passage 146. Additionally, if the free piston 185 moves to a side opposite the lid member 182 from this state, the shaft portion 209 is drawn out from the smaller-diameter hole 194B of the passage opening portion 194, and the tapered surface portion 211 of the shaft portion 209 is spaced apart from the inner peripheral surface of the tapered hole 194A of the passage opening portion 194 by a distance according to the movement of the free piston 185. If the shutter member 206 is spaced apart from the passage opening portion 194 by a predetermined distance or more, the passage opening portion 194 is opened with the passage area of the smaller-diameter hole 194B. In this way, the shutter member 206 also adjusts the passage area of the passage opening portion 194 depending on the position of the free piston 185 with respect to the housing 184.

In other words, the shutter member 206 and the passage opening portion 194 also constitute a variable orifice 216 that makes the passage area of the rod passage 146 variable. The variable orifice 216, similarly to the first embodiment, also makes the passage area variable before and after reversal from a compression stroke to an extension stroke at the time of input of low-frequency vibration to the shock absorber, at which the displacement of the free piston 185 with respect to the housing 184 increases.

According to the above fourth embodiment, since a resistance force is generated against the displacement of the free piston 185 by the coil spring 186,187, durability can be improved.

According to the embodiments described above, a configuration is adopted in which a shock absorber includes a cylinder having a working fluid enclosed therein; a piston slidably fitted into the cylinder and partitioning the inside of the cylinder into a rod-side chamber and a bottom-side chamber; a piston rod having one end connected to the piston and the other end extending to the outside of the cylinder; a housing provided on one end side of the piston rod; a free piston slidably inserted into the housing; a rod passage allowing a pressure chamber within the housing delimited by the free piston to communicate with the rod-side chamber; and damping valves provided in passages allowing the rod-side chamber to communicate with the bottom-side chamber, and the free piston is provided with a shutter member that adjusts the opening area of a pressure chamber opening of the rod passage according to the movement of the free piston. For this reason, it is possible to control the damping force characteristics more finely.

Additionally, a configuration is adopted in which the pressure chamber opening of the rod passage opens to an end face of the piston rod, and the shutter member has a shape capable of protruding from the free piston and entering the pressure chamber opening. Accordingly, it is possible to adjust the passage area of the rod passage which has a simple and compact structure.

Additionally, a configuration is adopted in which the shock absorber further includes a resistance element that generates a resistance force against the displacement of the free piston. Accordingly, the damping force can be smoothly changed in a case where the damping force is changed in response to the operation frequency of the piston.

Additionally, durability can be improved by adopting a configuration in which the resistance element is a spring.

Additionally, a configuration is adopted in which the resistance element has one or a plurality of elastic bodies provided between the free piston and the housing, at least one contact surface of a free piston contact surface of the free piston that the elastic body contacts and a housing contact surface of the housing that the elastic body contacts has a face that inclines with respect to the movement direction of the free piston, and the shortest distance of the free piston contact surface and the housing contact surface varies depending on the movement of the free piston. Accordingly, a damping force can be smoothly changed in a case where the damping force is changed in response to frequency.

Additionally, a configuration is adopted in which the elastic body has a first elastic body that is compressively deformed when the free piston has moved in a first direction, and a second elastic body that is compressively deformed when the free piston has moved in a second direction. Thereby, a damping force can be smoothly changed in both an extension stroke and a compression stroke.

Although an example in which the present invention is used for a mono-tube type hydraulic shock absorber is shown in the above respective embodiments, the present invention is not limited to this, and may be used for a double-tube type hydraulic shock absorber in which an external tube provided at an outer periphery of the cylinder, and a reservoir is provided between the external tube and the cylinder, and can be used for all shock absorbers. Additionally in the case of the double-tube type hydraulic shock absorber, the present invention can also be applied to a bottom valve by providing the bottom of the cylinder with the bottom valve that allows a lower chamber to communicate with the reservoir, and providing the bottom valve with the above housing. Additionally, in a case where an oil passage that communicates with the inside of the cylinder is provided outside the cylinder, and this oil passage is provided with a damping force generating mechanism, the above housing is provided outside the cylinder.

In addition, although the hydraulic shock absorber is shown as an example in the above embodiments, water and air can also be used as a fluid.

Moreover, although an example in which O rings serving as elastic bodies that are the resistance elements are two is shown in the above respective embodiments, one O ring or three or more O rings may be used within the scope of the same technical idea if necessary.

Additionally, although an example in which rings made of rubber (resin) serving as elastic bodies that are the resistance elements is shown in the above respective embodiments, a plurality of balls made of rubber may be provided at intervals in the circumferential direction. Additionally, the elastic bodies that can be used for the present invention may not be rubber so long as not one elastic body having elasticity in the axial direction but a plurality of elastic bodies having elasticity in the axial direction is provided. For example, springs made of metal can improve durability.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A shock absorber comprising:
a cylinder having a working fluid enclosed therein;
a piston slidably fitted into the cylinder and partitioning an inside of the cylinder into a rod-side chamber and a bottom-side chamber;
a piston rod having a first end connected to the piston and a second end extending to an outside of the cylinder;
a housing provided on the first end side of the piston rod;
a free piston inserted into the housing as to be movable with respect to the housing from a neutral position to each of first and second opposite sides in an axial direction;
a rod passage allowing a pressure chamber within the housing delimited by the free piston to communicate with the rod-side chamber;
damping valves provided in passages allowing the rod-side chamber to communicate with the bottom-side chamber,
wherein the free piston is provided with a shutter member that adjusts an opening area of a pressure chamber opening formed in the pressure chamber of the rod passage according to a movement of the free piston,
the shutter member protruding from the free piston and having a shape that is capable of at least partially entering the pressure chamber opening, and
when the free piston moves from the neutral position to each of the first and second sides in the axial direction, the shutter member is configured to either increase or decrease the opening area of the pressure chamber opening between the shutter member and the pressure chamber opening.

2. The shock absorber according to claim 1, wherein the pressure chamber opening is formed by a smaller-diameter hole and a pair of tapered holes which are located on opposite sides of the smaller-diameter hole in the axial direction and which have larger diameters away from the smaller-diameter hole.

3. The shock absorber according to claim 2, wherein
the shutter member is formed by a larger-diameter portion, which is located in the smaller-diameter hole of the pressure chamber opening when the free piston is at the neutral position, and a pair of smaller-diameter cylindrical surface portions which are located on opposite sides of the larger-diameter portion in the axial direction and which have smaller diameters than the larger-diameter portion, and
when the free piston moves from the neutral position to each of the first and second sides in an axial direction, the shutter member is configured to increase the opening area of the pressure chamber opening.

4. The shock absorber according to claim 3, wherein the larger-diameter portion of the shutter member is formed by a larger-diameter cylindrical surface portion, which has a constant diameter, and wherein the smaller-diameter cylindrical surface portions are formed by a pair of tapered surface portions which are located on opposite sides of the larger-diameter cylindrical surface portion in the axial direction and which have smaller diameters away from the larger-diameter cylindrical surface portion.

5. The shock absorber according to claim 2, wherein
the shutter member is formed by a smaller-diameter cylindrical surface portion, which is located in the smaller-diameter hole of the pressure chamber opening when the free piston is at the neutral position, and a pair of tapered surface portions which are located on opposite sides of the smaller-diameter cylindrical surface portion in the axial direction and have larger diameters away from the smaller-diameter cylindrical surface portion, and
when the free piston moves from the neutral position to each of the first and second sides in an axial direction, the shutter member is configured to decrease the opening area of the pressure chamber opening.

6. The shock absorber according to claim 1, further comprising a resistance element that generates a resistance force against axial movement of the free piston from the neutral position toward the first and second sides.

7. The shock absorber according to claim 6, wherein the resistance element is a spring which biases the free piston so as to return the free piston to the neutral position.

8. The shock absorber according to claim 1, wherein:
the shutter member is formed by a smaller-diameter cylindrical surface portion, which has a constant diameter in the axial direction, and a pair of tapered surface portions which have larger diameters away from the smaller-diameter cylindrical surface portion, and
when the free piston moves from the neutral position to each of the first and second sides in an axial direction, the shutter member is configured to decrease the opening area of the pressure chamber opening.

9. The shock absorber according to claim 1, wherein
the shutter member is formed by a larger-diameter portion and a pair of smaller-diameter cylindrical surface portions which are located on opposite sides of the larger-diameter portion in the axial direction and which have smaller diameters than the larger-diameter portion, and
when the free piston moves from the neutral position to each of the first and second sides in an axial direction, the shutter member is configured to increase the opening area of the pressure chamber opening.

10. A shock absorber comprising:
a cylinder having a working fluid enclosed therein;
a piston slidably fitted into the cylinder and partitioning an inside of the cylinder into a rod-side chamber and a bottom-side chamber;
a piston rod having a first end connected to the piston and a second end extending to an outside of the cylinder;
a housing provided on the first end side of the piston rod;
a free piston inserted into the housing as to be axially movable with respect to the housing;
a rod passage allowing a pressure chamber within the housing delimited by the free piston to communicate with the rod-side chamber; and
damping valves provided in passages allowing the rod-side chamber to communicate with the bottom-side chamber,
wherein
the free piston is provided with a shutter member that adjusts an opening area of a pressure chamber opening formed in the pressure chamber of the rod passage according to a movement of the free piston,
the shutter member protrudes from the free piston, and has a shape capable of entering the pressure chamber opening,
the shutter member is formed by a larger-diameter portion and a cylindrical surface portion which is located between the larger-diameter portion and the free piston, the cylindrical surface portion having a smaller diameter than the larger-diameter portion, and
when the free piston moves from the neutral position toward the piston rod, the shutter member is configured to increase the opening area of the pressure chamber opening between the shutter member and the pressure chamber opening.

11. The shock absorber according to claim 10, further comprising a resistance element that generates a resistance force against movement of the free piston.

12. The shock absorber according to claim 11, wherein the resistance element is a spring which biases the free piston so as to return the free piston to the neutral position.

13. A shock absorber comprising:
a cylinder having a working fluid enclosed therein;
a piston slidably fitted into the cylinder and partitioning an inside of the cylinder into a rod-side chamber and a bottom-side chamber;
a piston rod having a first end connected to the piston and a second end extending to an outside of the cylinder;
a housing provided on the first end side of the piston rod;
a free piston inserted into the housing as to be axially movable with respect to the housing;
a rod passage allowing a pressure chamber within the housing delimited by the free piston to communicate with the rod-side chamber;
damping valves provided in passages allowing the rod-side chamber to communicate with the bottom-side chamber; and
a resistance element that generates a resistance force against the movement of the free piston,
wherein
the free piston is provided with a shutter member that adjusts an opening area of a pressure chamber opening formed in the pressure chamber of the rod passage according to a movement of the free piston,
the resistance element has one or a plurality of elastic bodies provided between the free piston and the housing,
at least one contact surface of a free piston contact surface of the free piston that the elastic body contacts and a housing contact surface of the housing that the elastic body contacts has a face that inclines with respect to the movement direction of the free piston, and
a shortest distance between the free piston contact surface and the housing contact surface varies depending on the movement of the free piston.

14. The shock absorber according to claim 13,
wherein the shutter member protrudes from the free piston and has a shape capable of entering the pressure chamber opening.

15. The shock absorber according to claim 14,
wherein a plurality of the elastic bodies is provided, and
wherein the plurality of elastic bodies comprise a first elastic body that is compressively deformed when the free piston has moved in a first direction, and a second elastic body that is compressively deformed when the free piston has moved in a second direction.

16. The shock absorber according to claim 13,
wherein a plurality of the elastic bodies is provided, and
wherein the plurality of elastic bodies comprise a first elastic body that is compressively deformed when the free piston has moved in a first direction, and a second elastic body that is compressively deformed when the free piston has moved in a second direction.

17. A shock absorber comprising:
a cylinder having a working fluid enclosed therein;
a piston slidably fitted into the cylinder and partitioning an inside of the cylinder into a rod-side chamber and a bottom-side chamber;
a piston rod having a first end connected to the piston and a second end extending to an outside of the cylinder;
a housing provided on the first end side of the piston rod;
a free piston inserted into the housing as to be axially movable with respect to the housing;
a rod passage allowing a pressure chamber within the housing delimited by the free piston to communicate with the rod-side chamber,
damping valves provided in passages allowing the rod-side chamber to communicate with the bottom-side chamber; and
a resistance element that generates a resistance force against the movement of the free piston,
wherein the free piston is provided with a shutter member that adjusts an opening area of a pressure chamber opening formed in the pressure chamber of the rod passage according to a movement of the free piston, the shutter member protrudes from the free piston, and has a shape capable of entering the pressure chamber opening, and the resistance element is a pair of coil springs which are located on opposite sides of the free piston in an axial direction, and the free piston is located at a predetermined neutral position by biasing forces of the pair of the coil springs.

18. The shock absorber according to claim 17, wherein the shutter member is a shaft portion which has a cylindrical surface portion having a constant diameter, and the shutter member is configured to narrow the opening area of the pressure chamber opening with the cylindrical surface portion being inserted into the pressure chamber opening.

19. The shock absorber according to claim 18, wherein the shaft portion is continuous with the cylindrical surface portion, and has a tapered surface portion which has smaller diameter away from the cylindrical surface portion in the axial direction.

20. A shock absorber comprising:

a cylinder having a working fluid enclosed therein;

a piston slidably fitted into the cylinder and partitioning an inside of the cylinder into a rod-side chamber and a bottom-side chamber;

a piston rod having a first end connected to the piston and a second end extending to an outside of the cylinder;

a housing provided on the first end side of the piston rod;

a free piston inserted into the housing as to be axially movable with respect to the housing;

a rod passage allowing a pressure chamber within the housing delimited by the free piston to communicate with the rod-side chamber; and damping valves provided in passages allowing the rod-side chamber to communicate with the bottom-side chamber, wherein the free piston is provided with a shutter member that adjusts an opening area of a pressure chamber opening formed in the pressure chamber of the rod passage according to a movement of the free piston, the shutter member protrudes from the free piston, the shutter member being different from the free piston, and has a shape capable of entering the pressure chamber opening, and a spacer is located between the shutter member and the free piston, the spacer being capable of adjusting a protrusion length of the shutter member.

* * * * *